(12) United States Patent
Zhang

(10) Patent No.: US 12,713,289 B2
(45) Date of Patent: Aug. 18, 2026

(54) METHOD AND DEVICE FOR RANDOM ACCESS IN SMALL DATA TRANSMISSIONS

(71) Applicant: Apogee Networks, LLC, Plano, TX (US)

(72) Inventor: Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 428 days.

(21) Appl. No.: 18/120,436

(22) Filed: Mar. 13, 2023

(65) Prior Publication Data

US 2023/0217305 A1 Jul. 6, 2023

Related U.S. Application Data

(63) Continuation of application No. PCT/CN2021/117098, filed on Sep. 8, 2021.

(30) Foreign Application Priority Data

Sep. 16, 2020 (CN) ......................... 202010975488.5

(51) Int. Cl.
*H04W 28/06* (2009.01)
*H04W 74/0833* (2024.01)
(Continued)

(52) U.S. Cl.
CPC ....... *H04W 28/06* (2013.01); *H04W 74/0833* (2013.01); *H04W 76/27* (2018.02); *H04W 74/0836* (2024.01)

(58) Field of Classification Search
CPC .. H04W 28/06; H04W 74/0833; H04W 76/27
See application file for complete search history.

(56) References Cited

U.S. PATENT DOCUMENTS

2019/0313345 A1 10/2019 Jiang et al.
2019/0394805 A1 * 12/2019 Kim .................... H04B 7/0404
(Continued)

FOREIGN PATENT DOCUMENTS

CN 105744610 A 7/2016
CN 109565888 A 4/2019
(Continued)

OTHER PUBLICATIONS

ISR received in application No. PCT/CN2021/117098 dated Nov. 24, 2021.
(Continued)

*Primary Examiner* — Brian P Cox
(74) *Attorney, Agent, or Firm* — Volpe Koenig

(57) ABSTRACT

The present disclosure provides a method and device used in a communication node for wireless communications. A communication node determines that first data is transmitted in a first state, selects a first step-size, and transmits a first signal according to first target power; updates a first counter; when the first counter is not greater than a first threshold, and determines that a second counter is updated, transmits a third signal according to second target power; monitors a second signal in a first time window; the first state comprises RRC_INACTIVE State; the first data comprises a small data packet; the first signal, the second signal and the third signal are used for random access procedure; the first counter is used to count a number of transmission(s) of a preamble sequence; the second counter is used to count a number of time(s) the first step-size is increased.

18 Claims, 7 Drawing Sheets

(51) Int. Cl.
*H04W 74/0836* (2024.01)
*H04W 76/27* (2018.01)

(56) References Cited

U.S. PATENT DOCUMENTS

| | | | | |
|---|---|---|---|---|
| 2020/0100297 | A1* | 3/2020 | Agiwal | H04W 52/365 |
| 2020/0107277 | A1 | 4/2020 | Jeon et al. | |
| 2021/0144656 | A1* | 5/2021 | Wu | H04W 52/362 |
| 2022/0210826 | A1* | 6/2022 | Lin | H04W 74/0836 |
| 2022/0295571 | A1* | 9/2022 | Da Silva | H04W 24/02 |
| 2023/0225004 | A1* | 7/2023 | Wang | H04W 76/30 370/328 |

FOREIGN PATENT DOCUMENTS

| | | | | |
|---|---|---|---|---|
| CN | 110536403 | A | 12/2019 | |
| CN | 110769494 | A | 2/2020 | |
| WO | 2018232381 | A1 | 12/2018 | |
| WO | WO-2020020290 | A1 * | 1/2020 | H04W 52/362 |

OTHER PUBLICATIONS

First Office Action of Chinese patent application No. CN202010975488.5 dated Feb. 20, 2024.

First Search Report of Chinese patent application No. CN202010975488.5 dated Feb. 19, 2024.

MediaTek Inc. "MAC behaviour for LBT failures in Msg1 and Msg3 transmissions"3GPP TSG-RAN WG2 Meeting #105bis R2-1904432 Apr. 12, 2019.

Third Generation Partnership Project, "Technical Specification Group Radio Access Network; NR; Medium Access Control (MAC) protocol specification (Release 16)," 3GPP TS 38.321 V16.1.0 (Jul. 2020).

Third Generation Partnership Project, "Technical Specification Group Radio Access Network; NR; Radio Resource Control (RRC) protocol specification (Release 16)," 3GPP TS 38.331 V16.1.0 (Jul. 2020).

* cited by examiner

Difference value of second target power and first target power ⟷ (being related to) First step-size and second offset First field in second signal → (being used to indicate) Whether first data is dropped to be transmitted in first state

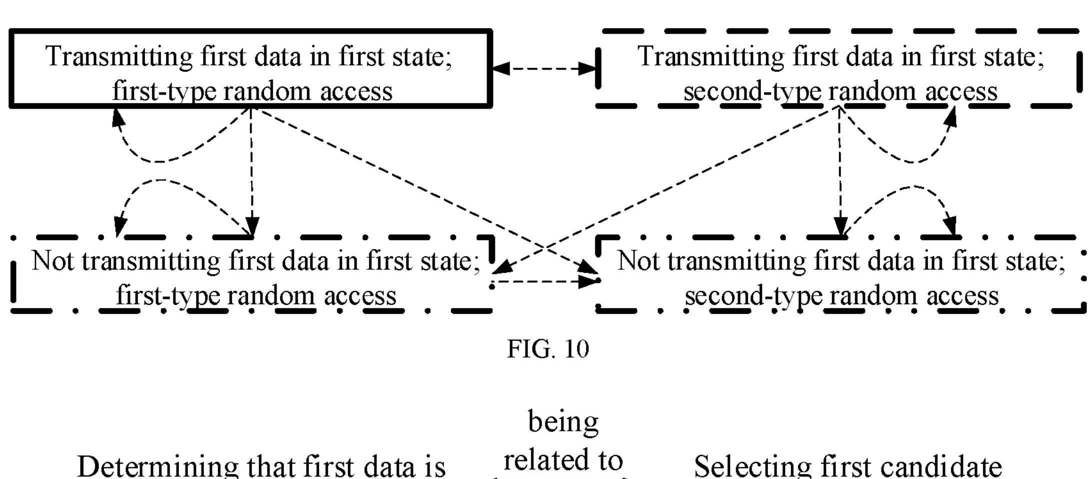
FIG. 10
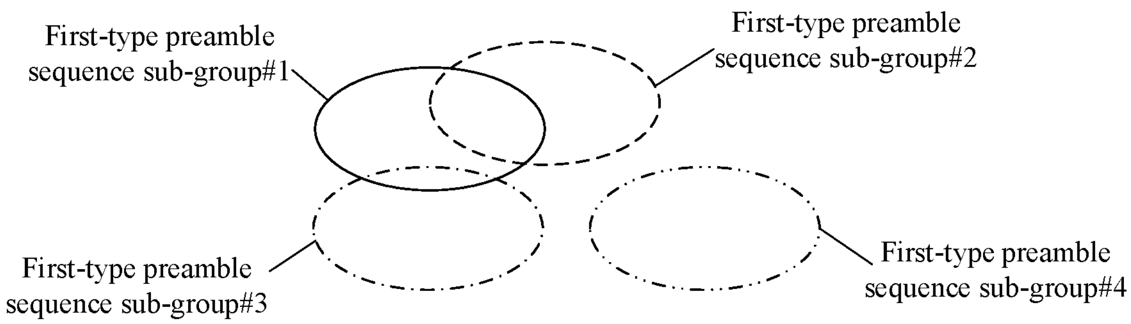
FIG. 11
FIG. 12
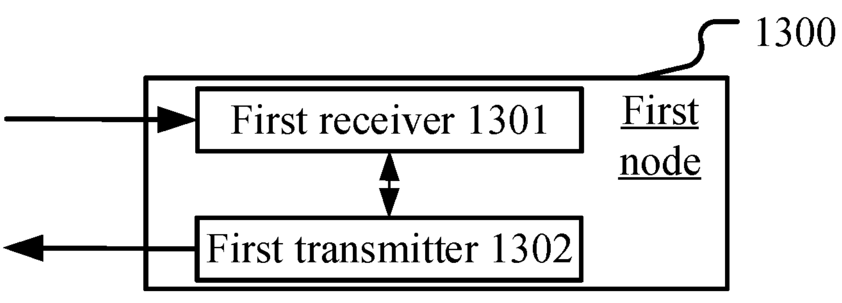
FIG. 13
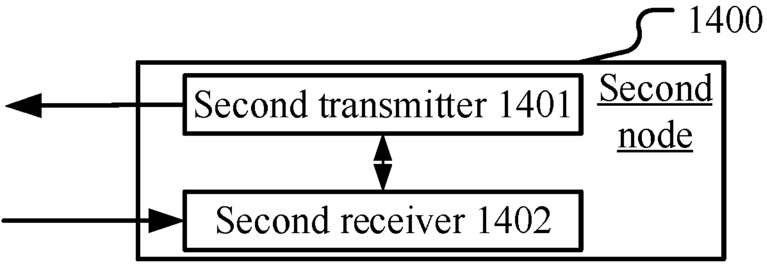
FIG. 14

METHOD AND DEVICE FOR RANDOM ACCESS IN SMALL DATA TRANSMISSIONS

CROSS REFERENCE TO RELATED APPLICATIONS

This application is the continuation of the international patent application No. PCT/CN2021/117098, filed on Sep. 8, 2021, which claims the priority benefit of Chinese Patent Application No. 202010975488.5, filed on Sep. 16, 2020, the full disclosure of which is incorporated herein by reference.

BACKGROUND

Technical Field

The present application relates to transmission methods and devices in wireless communication systems, and in particular to a transmission method and device related to small data packet services.

Related Art

New Radio (NR) supports Radio Resource Control (RRC) _INACTIVE State, and until 3GPP Rel-16 version, RRC_INACTIVE State does not support transmitting data. When a User Equipment (UE) has periodic or aperiodic infrequent small data packets to be transmitted in RRC_INACTIVE state, it needs to resume the connection first, that is, switch to RRC_CONNECTED state, and then switches to RRC_INACTIVE state after the data is transmitted. 3GPP RAN #86 plenary decided to carry out a work item of "small data transmission in NR INACTIVE state" to study small data transmission technology in RRC_INACTIVE state, comprising transmitting uplink data in preconfigured Physical Uplink Shared Channel (PUSCH) resources, or carrying data with Message 3 (Msg3) or MsgB in Random Access (RA) procedure.

SUMMARY

When a UE transmits small data packets in RRC_INACTIVE state, once the transmission starts, it is necessary to ensure the success of the transmission. When a preamble sequence is transmitted and if conditions are satisfied, it is possible to ramp the power as much as possible to ensure the transmission of small data packets. Therefore, it is necessary to enhance the random access preamble transmission power when transmitting small data packets in RRC_INACTIVE state. Otherwise, 2-stepRA can fallback to 4-stepRA, and after introducing small packet transmission, the fallback mechanism needs to be enhanced.

To address the above problem, the present application provides a solution. For the above problem description, the licensed spectrum access scenario is used as an example; the present application is also applicable to scenarios such as unlicensed frequency spectrum access to achieve similar technical effects in licensed frequency spectrum scenario. Additionally, the adoption of a unified solution for various scenarios contributes to the reduction of hardware complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising:

determining whether to transmit first data in a first state; when it is determined to transmit the first data in the first state, selecting a first step-size, transmitting a first signal according to first target power; updating a first counter; determining whether to update a second counter; when the first counter is not greater than a first threshold, and determining to update the second counter, transmitting a third signal according to second target power; when the first counter is greater than the first threshold, determining that the first data transmission is failed; and monitoring a second signal in a first time window;

herein, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, a problem to be solved in the present application comprises: how to ensure that small data packets are transmitted through the random access procedure in RRC_INACTIVE State.

In one embodiment, characteristics of the above method comprise: when conditions for ramping power are satisfied, target receiving power of a preamble is increased according to a first step-size.

In one embodiment, characteristics of the above method comprise: a first step-size is dedicated to transmitting small data packets through the random access procedure in RRC_INACTIVE state.

In one embodiment, advantages of the above method comprise: improving the probability of a successful transmission of small data packets.

According to one aspect of the present application, comprising:

receiving a first signaling;

herein, the first signaling indicates the first step-size.

According to one aspect of the present application, comprising:

receiving a second signaling;

herein, the second signaling indicates a first offset and a second step-size, and a sum of the first offset and the second step-size is used to determine the first step-size.

According to one aspect of the present application, comprising:

transmitting first sub-data; transmitting second sub-data; and determining that a transmission of the first sub-data is successful, and a transmission of the second sub-data is failed;

herein, the first data comprises the first sub-data and the second sub-data; a transmission of the first sub-data being successful and a transmission of the second sub-data being failed are used to determine that a difference value of the second target power and the first target power is related to the first step-size.

In one embodiment, characteristics of the above method comprise: when part of the first data is successfully transmitted and part is not successfully transmitted, the first step-size is adopted.

In one embodiment, advantages of the above method comprise: when any part of the first data is not transmitted successfully, the first step-size is not adopted to avoid ramping the power too fast.

According to one aspect of the present application, wherein when the first signal is used for a first-type random access, and the third signal is used for a second-type random access, a difference value of the second target power and the first target power is also related to a second offset, a difference value of a first sub-step-size and a second sub-step-size as well as the first counter are used to determine the second offset, and the first sub-step-size and the second sub-step-size are respectively used to determine target power of the first-type random access and the second-type random access.

In one embodiment, characteristics of the above method comprise: when switching between different random access types, the power ramping increases the impact of differences of different random access types.

According to one aspect of the present application, wherein the second signal comprises a first field, and the first field is used to indicate whether the first data is dropped to be transmitted in the first state.

In one embodiment, characteristics of the above method comprise: when switching between different random access types, it indicates whether a UE can continue to execute small data packet transmission.

According to one aspect of the present application, comprising:

receiving a third signaling;

herein, the third signaling is used to determine a first candidate preamble sequence sub-group, determining to transmit the first data in the first state is related to the first candidate preamble sequence sub-group, the first candidate preamble sequence sub-group is one of N1 first-type preamble sequence sub-group(s), N1 being a positive integer greater than 1; the first signal comprises a preamble sequence in the first candidate preamble sequence sub-group.

In one embodiment, determining that the first data is transmitted in the first state is unrelated to the first candidate preamble sequence sub-group.

In one embodiment, characteristics of the above method comprise: preamble sequences are divided into four groups according to the random access type and whether small data packets are transmitted in RRC_INACTIVE.

In one embodiment, characteristics of the above method comprise: a UE transmitting small data packets in RRC_INACTIVE uses a dedicated preamble sequence set.

In one embodiment, advantages of the above method comprise: avoiding the impact on users of other random access purposes.

The present application provides a method in a second node for wireless communications, comprising:

receiving a first signal; receiving a third signal; and when the first signal is received, transmitting a second signal;

herein, when first data is determined to be transmitted in a first state, a first step-size is selected; the first signal is transmitted according to first target power; a first counter is updated; a second counter is determined whether it is updated; when the first counter is not greater than a first threshold, and the second counter is determined to be updated, the third signal is transmitted according to second target power; when the first counter is greater than the first threshold, a transmission of the first data is determined failed; the second signal is monitored in a first time window; the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

According to one aspect of the present application, comprising:

transmitting a first signaling;

herein, the first signaling indicates the first step-size.

According to one aspect of the present application, comprising:

transmitting a second signaling;

herein, the second signaling indicates a first offset and a second step-size, and a sum of the first offset and the second step-size is used to determine the first step-size.

According to one aspect of the present application, comprising:

monitoring first sub-data; monitoring second sub-data;

herein, a transmission of the first sub-data is determined successful, and a transmission of the second sub-data is determined failed; the first data comprises the first sub-data and the second sub-data; a transmission of the first sub-data being successful and a transmission of the second sub-data being failed are used to determine that a difference value of the second target power and the first target power is related to the first step-size.

According to one aspect of the present application, wherein when the first signal is used for a first-type random access, and the third signal is used for a second-type random access, a difference value of the second target power and the first target power is also related to a second offset, a difference value of a first sub-step-size and a second sub-step-size as well as the first counter are used to determine the second offset, and the first sub-step-size and the second sub-step-size are respectively used to determine target power of the first-type random access and the second-type random access.

According to one aspect of the present application, wherein the second signal comprises a first field, and the first field is used to indicate whether the first data is dropped to be transmitted in the first state.

According to one aspect of the present application, comprising:

transmitting a third signaling;

herein, the third signaling is used to determine a first candidate preamble sequence sub-group, determining to transmit the first data in the first state is related to the first candidate preamble sequence sub-group, the first candidate preamble sequence sub-group is one of N1 first-type preamble sequence sub-group(s), N1 being a positive integer greater than 1; the first signal comprises a preamble sequence in the first candidate preamble sequence sub-group.

The present application provides a first node for wireless communications, comprising:

a first transmitter, determining whether to transmit first data in a first state; when it is determined to transmit the first data in the first state, selecting a first step-size, transmitting a first signal according to first target power; updating a first counter; determining whether to update a second counter; when the first counter is not greater than a first threshold, and determining to update the second counter, transmitting a third signal according to second target power; when the first counter is greater than the first threshold, determining that the first data transmission is failed; and a first receiver, monitoring a second signal in a first time window;

herein, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

The present application provides a second node for wireless communications, comprising:

a second receiver, receiving a first signal; receiving a third signal; and a second transmitter, when the first signal is received, transmitting a second signal;

herein, when first data is determined to be transmitted in a first state, a first step-size is selected; the first signal is transmitted according to first target power; a first counter is updated; a second counter is determined whether it is updated; when the first counter is not greater than a first threshold, and the second counter is determined to be updated, the third signal is transmitted according to second target power; when the first counter is greater than the first threshold, a transmission of the first data is determined failed; the second signal is monitored in a first time window; the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the present application has the following advantages over conventional schemes:

- improving the probability of successful transmission of small data packets;
- the first step-size is used only when a transmission of partial data is successful, thus avoiding ramping the power too fast;
- avoiding the impact on users of other random access purposes.

BRIEF DESCRIPTION OF THE DRAWINGS

Other features, objects and advantages of the present application will become more apparent from the detailed description of non-restrictive embodiments taken in conjunction with the following drawings:

FIG. 10 illustrates a schematic diagram of transmitting fallback of first data in a first state according to one embodiment of the present application;

FIG. 11 illustrates a schematic diagram of determining to transmit first data in a first state being related to selecting a first candidate preamble sequence sub-group according to one embodiment of the present application;

FIG. 12 illustrates a schematic diagram of N1 first-type preamble sequence sub-group(s) according to one embodiment of the present application;

FIG. 13 illustrates a structure block diagram of a processor in a first node according to one embodiment of the present application;

FIG. 14 illustrates a structure block diagram of a processor in a second node according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
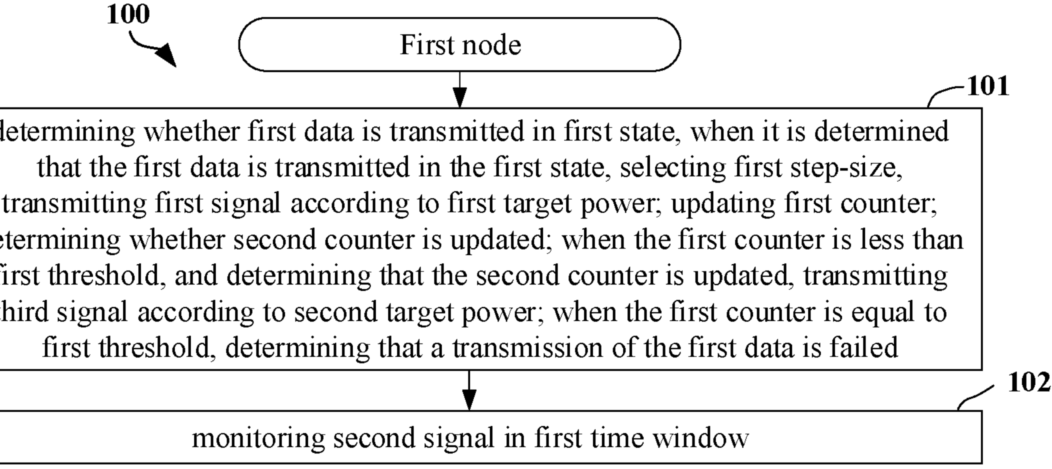
FIG. 1 illustrates a flowchart of transmissions of a first signal, a second signal and a third signal according to one embodiment of the present application.

Embodiment 1 illustrates a flowchart of transmissions of a first signal, a second signal and a third signal according to one embodiment of the present application, as shown in FIG. 1. In FIG. 1, each step represents a step, it should be particularly noted that the sequence order of each box herein does not imply a chronological order of steps marked respectively by these boxes.

In embodiment 1, the first node in the present application determines whether to transmit first data in first state in step 101; when it is determined to transmit the first data in the first state, selects a first step-size, transmits a first signal according to first target power; updates a first counter; determines whether to update a second counter; when the first counter is not greater than a first threshold, and determines that the second counter is updated, transmits a third signal according to second target power; when the first counter is greater than the first threshold, determines that the first data transmission is failed; monitors a second signal in a first time window in step 102; herein, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the phrase of determining whether to transmit first data in a first state comprises: whether the first data is allowed to be transmitted in the first state.

In one embodiment, the phrase of determining whether to transmit first data in a first state comprises: whether an execution of small data packet transmission is allowed in RRC_INACTIVE state.

In one embodiment, whether first data is transmitted in a first state is determined according to first receiving quality.

In one subembodiment of the embodiment, the first receiving quality comprises at least one of Reference Signal Received Power (RSRP), or Reference Signal Received Quality (RSRQ), or a Received Signal Strength Indicator (RSSI), or a Signal to Noise and Interference Ratio (SINR), or a Channel Status Information reference signal resource indicator (CRI).

In one subembodiment of the embodiment, unit for measurement of the first receiving quality comprises dBm.

In one subembodiment of the embodiment, the first receiving quality not being less than a first quality threshold is used to determine that the first data is transmitted in the first state, and the not being less than comprises being greater than or being equal to.

In one subsidiary embodiment of the subembodiment, the first quality threshold is pre-configured through an RRC signaling.

In one subsidiary embodiment of the above subembodiment, the first quality threshold is configurable.

In one subembodiment of the embodiment, the first receiving quality being less than a first quality threshold is used to determine not transmitting the first data in the first state.

In one subembodiment of the embodiment, the first receiving quality not being greater than a first quality threshold is used to determine that the first data is transmitted in the first state, and the not being greater than comprises being greater than or being equal to.

In one subembodiment of the embodiment, the first receiving quality being greater than a first quality threshold is used to determine that the first data is not transmitted in the first state.

In one subembodiment of the embodiment, for a first-type random access and a second-type random access, the first receiving quality is the same.

In one subembodiment of the embodiment, for a first-type random access and a second-type random access, the first receiving quality is different.

In one embodiment, the phrase of when determining that the first data is transmitted in the first state comprises: when conditions of transmitting the first data in the first state being satisfied.

In one embodiment, the phrase of when determining that the first data is transmitted in the first state comprises: when the first data being transmitted in the first state is determined according to first receiving quality.

In one embodiment, whether first data is transmitted in a first state is determined according to the first data size.

In one subembodiment of the embodiment, the first data size not being greater than a first size threshold is used to determine that first data is transmitted in a first state.

In one subembodiment of the above embodiment, the first data size is pre-configured through RRC.

In one subembodiment of the embodiment, the first data size is pre-configurable.

In one subembodiment of the embodiment, for a first-type random access and a second-type random access, the first data sizes are the same.

In one subembodiment of the embodiment, for a first-type random access and a second-type random access, the first data sizes are different.

In one embodiment, whether the first data is transmitted in the first state is determined according to first receiving quality and a first data size.

In one embodiment, the first data is generated by Medium Access Control (MAC) layer.

In one embodiment, the first data is generated at Radio Resource Control (RRC) layer.

In one embodiment, the first data is generated at physical (PHY) layer.

In one embodiment, the first data is generated by a higher layer.

In one embodiment, the first data comprises a MAC subheader.

In one embodiment, the first data does not comprise a MAC subheader.

In one embodiment, the first data comprises a Common Control Channel (CCCH).

In one embodiment, the first data does not comprise a CCCH.

In one embodiment, the first data comprises a Dedicated Transmission Channel (DTCH) or an NAS message.

In one embodiment, the first data comprises a MAC Control Element (CE).

In one embodiment, the first data comprises a MAC Protocol Data Unit (PDU).

In one embodiment, the first data comprises a MAC Service Data Unit (SDU).

In one embodiment, the first data comprises a Transmission Block Size (TBS).

In one embodiment, the first data comprises a data block of PHY.

In one embodiment, the first data supports segmentation.

In one embodiment, the first data does not support segmentation.

In one embodiment, the first data is transmitted through message 3.

In one embodiment, the first data is transmitted through message A.

In one embodiment, the first data is transmitted through resources scheduled through message 2.

In one embodiment, the first data is transmitted through resources scheduled through message 4.

In one embodiment, the first data is transmitted through resources scheduled through message B.

In one embodiment, the first data is transmitted through pre-configured resources.

In one embodiment, the first data is transmitted through resources indicated by a Physical Downlink Control Channel (PDCCH) in a random access procedure.

In one embodiment, the first data is transmitted through resources indicated by a Random Access Response (RAR) in a random access procedure.

In one embodiment, the first data is transmitted through resources indicated by a MAC CE in a random access procedure.

In one embodiment, the first data comprises M1 first-type sub-data, M1 being a positive integer.

In one subembodiment of the above embodiment, M1 is equal to 1.

In one subembodiment of the above embodiment, M1 is greater than 1.

In one subembodiment of the above embodiment, a confirmation message is received after the M1 first-type sub-data is transmitted.

In one subembodiment of the above embodiment, a confirmation message is received after any of the M1 first-type sub-data is transmitted.

In one subembodiment of the above embodiment, the M1 first-type sub-data is transmitted through a time-division method.

In one embodiment, the phrase that the first state comprises RRC_INACTIVE State comprises: the first state refers to the RRC_INACTIVE state.

In one embodiment, the phrase that the first state comprises RRC_INACTIVE State comprises:

the RRC_INACTIVE State is a state in the first state.

In one embodiment, the first state comprises a CM state.

In one embodiment, the first state comprises an RRC state.

In one subembodiment of the embodiment, the first radio state comprises an CM-Connected state.

In one subembodiment of the embodiment, the first radio state comprises an CM-Idle state.

In one subembodiment of the embodiment, the first radio state comprises an CM-Inactive state.

In one embodiment, the first state comprises RRC_CONNECTED state.

In one embodiment, the first state is not RRC_CONNECTED State.

In one embodiment, the first state comprises RRC_INACTIVE State.

In one subembodiment of the embodiment, the RRC_INACTIVE State comprises RRC_INACTIVE State.

In one subembodiment of the embodiment, the RRC_INACTIVE State comprises RRC_IDLE State.

In one subembodiment of the embodiment, the RRC_INACTIVE State comprises RRC_IDLE State.

In one subembodiment of the embodiment, the RRC_INACTIVE State comprises a Discontinuous Reception state.

In one embodiment, the behavior of selecting a first step-size comprises: determining the first step-size.

In one embodiment, the behavior of selecting a first step-size comprises: setting PREAMBLE_POWER_RAMPING_STEP as the first step-size.

In one embodiment, the first step-size is used to determine a Power-ramping factor.

In one embodiment, the first step-size is used to determine that the first data is transmitted in the first state, when the second counter is updated, ramped power of the second target power relative to the first target power.

In one embodiment, the first step-size is configured through an RRC signaling or a MAC layer signaling.

In one embodiment, unit for measurement of the first step-size comprises dB.

In one embodiment, the first step-size comprises a positive integer number of dB(s).

In one embodiment, the first step-size comprises one of 0 dB, 2 dB, 4 dB, or 6 dB.

In one embodiment, the first step-size comprises a field in an RRC message, and a name of the field comprises powerRampingStep.

In one embodiment, the first step-size comprises a field in an RRC message, and a name of the field comprises msgA-PreamblePowerRampingStep.

In one embodiment, the first step-size comprises a field in an RRC message, and a name of the field comprises powerRampingStepHighPriority.

In one embodiment, the first step-size comprises a field in an RRC message, and a name of the field comprises xxx-powerRampingStep.

In one embodiment, the first step-size comprises a field in an RRC message, and a name of the field comprises xxx-msgA-PreamblePowerRampingStep.

In one embodiment, the first step-size comprises a field in an RRC message, and a name of the field comprises xxx-powerRampingStepHighPriority.

In one embodiment, the phrase of transmitting a first signal according to first target power comprises: a value of PREAMBLE_RECEIVED_POWER is equal to the first target power, and the first signal is transmitted by using the first target power.

In one embodiment, the phrase of transmitting a first signal according to first target power comprises: transmit power of the first signal is acquired through a calculation of first target power.

In one embodiment, the phrase of transmitting a third signal according to second target power comprises: a value of PREAMBLE_RECEIVED_TARGET_POWER is equal to the second target power, and the third signal is transmitted by using the second target power.

In one embodiment, the phrase of transmitting a third signal according to second target power comprises: transmit power of the third signal is acquired through a calculation of second target power.

In one embodiment, the first signal comprises a first preamble sequence in a random access procedure.

In one embodiment, the first signal comprises a preamble sequence in a random access procedure.

In one embodiment, the third signal comprises a preamble sequence in a random access procedure.

In one embodiment, the first signal and the third signal are two continuous preamble sequences transmitted in a random access procedure.

In one embodiment, the first signal and the third signal are two discontinuous preamble sequences transmitted in a random access procedure.

In one embodiment, given target power comprises first initial power, and the given target power comprises the first target power or the second target power.

In one subembodiment of the above embodiment, the first initial power comprises msgA-PreambleReceivedTargetPower.

In one subembodiment of the above embodiment, the first initial power comprises PreambleReceivedTargetPower.

In one subembodiment of the above embodiment, the first initial power comprises xxx-msgA-PreambleReceivedTargetPower.

In one subembodiment of the above embodiment, the first initial power comprises xxx-preambleReceivedTargetPower.

In one embodiment, given target power comprises a first power difference value, and the given target power comprises the first target power or the second target power.

In one subembodiment of the above embodiment, the first power difference value comprises DELTA_PREAMBLE.

In one subembodiment of the above embodiment, the first power difference value is used to determine a power offset.

In one subembodiment of the above embodiment, the first power difference value is unrelated to a subcarrier spacing.

In one subembodiment of the above embodiment, the first power difference value is related to a subcarrier spacing.

In one subembodiment of the above embodiment, the first power difference value is related to a format of a preamble sequence.

In one subembodiment of the above embodiment, the first power difference value for the first signal is the same as the first power difference value for the third signal.

In one subembodiment of the above embodiment, the first power difference value for the first signal is different from the first power difference value for the third signal.

In one subembodiment of the embodiment, the first power difference value is equal to one of 0 dB, or −3 dB, or −6 dB.

In one subembodiment of the above embodiment, the first power difference value is equal to one of $(8+3\times\mu)$ dB, or $(5+3\times\mu)$ dB, or $(3+3\times\mu)$ dB, or $(3\times\mu)$, or $+3\times\mu)$.

In one embodiment, given target power comprises a first power increment, and the given target power comprises the first target power or the second target power.

In one subembodiment of the embodiment, the first power increment is related to the second counter.

In one subembodiment of the embodiment, the first power increment is equal to {a difference value of (product of the second counter and the first step-size) and the first step-size}.

In one subembodiment of the embodiment, the first power increment=(the second counter−1)×the first step-size.

In one subembodiment of the embodiment, the first power increment=(PREAMBLEPOWER_RAMPING_ COUNTER−1)×PREAMBLE_POWER_RAMPING_STEP.

In one subembodiment of the embodiment, the first power increment=(PREAMBLEPOWER_RAMPING_ COUNTER−1)×MSGA_PREAMBLE_POWER_RAMPING_ STEP.

In one subembodiment of the embodiment, the first power increment=(PREAMBLEPOWER_RAMPING_ COUNTER−1)×xxx_PREAMBLE_POWER_RAMPING_STEP.

In one subembodiment of the embodiment, the first power increment=(PREAMBLEPOWER_RAMPING_ COUNTER−1)×xxx_MSGA_PREAMBLE_POWER_RAMPING_ STEP.

In one embodiment, given target power comprises a first fallback power increment, and the given target power comprises the first target power or the second target power.

In one subembodiment of the above embodiment, the first fallback power increment comprises POWER_OFFSET_2STEP_RA.

In one subembodiment of the above embodiment, the first fallback power increment comprises POWER_OFFSET_2STEP_xxx_RA.

In one subembodiment of the above embodiment, the first fallback power increment is equal to a product of (a difference value of a second counter and 1) and (a difference value of a step-size corresponding to a first signal and a step-size corresponding to a second signal).

In one subsidiary embodiment of the subembodiment, a step-size corresponding to the first signal comprises a first step-size, and a step-size corresponding to the third signal comprises a candidate step-size.

In one subsidiary embodiment of the subembodiment, the first step-size comprises one of xxx_MSGA_PREAMBLE_POWER_RAMPING_STEP, the candidate step-size comprises MSGA_PREAMBLE_POWER_RAMPING_STEP, or PREAMBLE_POWER_RAMPING_STEP, or xxx_PREAMBLE_POWER_RAMPING_STEP.

In one subsidiary embodiment of the subembodiment, the first step-size comprises one of xxx_PREAMBLE_POWER_RAMPING_STEP, the candidate step-size comprises MSGA_PREAMBLE_POWER_RAMPING_STEP, or PREAMBLE_POWER_RAMPING_STEP, or xxx_MSGA_PREAMBLE_POWER_RAMPING_STEP.

In one embodiment, the given target power is related to at least one of the first initial power, or the first power difference value, or the first power increment, or the first fallback power increment.

In one embodiment, the given target power is related to all of the first initial power, the first power difference value and the first power increment.

In one embodiment, the given target power is related to all of the first initial power, the first power difference value, the first power increment and a first fallback power increment.

In one embodiment, the given target power is equal to a sum of the first initial power, the first power difference value and the first power increment.

In one embodiment, the given target power is equal to a sum of the first initial power, the first power difference value, the first power increment and a first fallback power increment.

In one embodiment, the first target power comprises target receiving power of the first signal when the second counter is equal to Cl, Cl being a positive integer.

In one embodiment, the second target power comprises target receiving power of the third signal when the second counter is equal to (a sum of Cl plus 1).

In one embodiment, the first target power comprises a value of PREAMBLE_RECEIVED_TARGET_POWER when the second counter is equal to Cl.

In one embodiment, the second target power comprises a value of PREAMBLE_RECEIVED_TARGET_POWER when the second counter is equal to (a sum of Cl plus 1).

In one embodiment, when the second counter is updated, the second target power is increased by the first step-size.

In one embodiment, when the second counter is updated, the second target power is increased by the first step-size.

In one embodiment, the behavior of updating a first counter comprises: changing a value of the first counter.

In one embodiment, the behavior of updating a first counter comprises: changing a current value of the first counter as another value.

In one embodiment, the behavior of updating a first counter comprises: increasing the first counter by 1.

In one embodiment, the behavior of updating a first counter comprises: subtracting the first counter by 1.

In one embodiment, the behavior of updating a first counter comprises: increasing the first counter by K1, K1 being a positive integer greater than 1.

In one embodiment, the behavior of updating a first counter comprises: subtracting the first counter by K1, K1 being a positive integer greater than 1.

In one embodiment, the behavior of determining whether to update a second counter comprises: judging whether a condition for updating the second counter is satisfied.

In one subembodiment of the above embodiment, a condition for updating the second counter comprises: a value of the first counter is greater than 1.

In one subembodiment of the above embodiment, a condition for updating the second counter comprises: no notification of suspending the first counter is received.

In one subembodiment of the above embodiment, a condition for updating the second counter comprises: an LBT failure indication for the first signal is not received.

In one subembodiment of the above embodiment, a condition for updating the second counter comprises: when at least one of a Synchronization Signal Block (SSB) or a Channel-state Information Reference Signal (CSI-RS) is not changed, determining that the second counter is updated.

In one embodiment, the behavior of updating a second counter comprises: changing a value of the second counter.

In one embodiment, the behavior of updating a second counter comprises: changing a current value of the second counter as another value.

In one embodiment, the behavior of updating a second counter comprises: increasing the second counter by 1.

In one embodiment, the behavior of updating a second counter comprises: subtracting the second counter by 1.

In one embodiment, the behavior of updating a second counter comprises: increasing the second counter by K2, K2 being a positive integer greater than 1.

In one embodiment, the behavior of updating a second counter comprises: subtracting the second counter by K2, K2 being a positive integer greater than 1.

In one embodiment, the phrase of the first counter not being greater than a first threshold comprises: the first counter is equal to the first threshold.

In one embodiment, the phrase of the first counter not being greater than a first threshold comprises: the first counter is less than the first threshold.

In one embodiment, the first threshold is configured through an RRC message.

In one embodiment, the first threshold comprises one of msgA-TransMax, or preambleTransMax, or xxx-msgA-TransMax, or xxx-preambleTransMax.

In one embodiment, the first time window comprises ra-ResponseWindow, or ra-ContentionResolutionTimer, or msgB-Response Window.

In one embodiment, the first time window is used to determine whether the first signal is received by the second node in the present application.

In one embodiment, the first time window comprises a first time sub-window and a second time sub-window.

In one subembodiment of the embodiment, the first time sub-window comprises ra-ResponseWindow, the second time sub-window comprises ra-ContentionResolutionTimer, the first time sub-window is used to determine a time interval for receiving the message 1, and the second time sub-window is used to determine a time interval for receiving the message 3.

In one embodiment, a start time of the first time window is the same as a time for transmitting the first signal.

In one embodiment, a start time of the first time window is equal to a certain time after a transmission time of the first signal.

In one embodiment, the phrase of the first time window comprises a positive integer number of slot(s) comprises: the first time window consists of a positive integer number of slot(s).

In one embodiment, the phrase of the first time window comprises a positive integer number of slot(s) comprises: a magnitude of the first time window is equal to a positive integer number of slot(s).

In one embodiment, the phrase of the first time window comprises a positive integer number of slot(s) comprises: a time interval of the first time window is a positive integer number of slot(s).

In one embodiment, the slot comprises: at least one of a slot, or a radio subframe, or a radio frame, or multiple Orthogonal Frequency Division Multiplexing (OFDM) symbols, or multiple Single Carrier Frequency Division Multiple Access (SC-FDMA) symbols.

In one embodiment, the positive integer number of slot(s) is(are) configurable.

In one embodiment, the positive integer number of slot(s) is(are) configured through an RRC message.

In one embodiment, the positive integer number of slot(s) is(are) pre-configured.

In one embodiment, the behavior of monitoring a second signal in a first time window comprises: in a running period of the first time window, monitoring the second signal.

In one embodiment, the behavior of monitoring a second signal in a first time window comprises: after the first time window starts and before the first time window is expired, monitoring the second signal.

In one embodiment, the behavior of monitoring a second signal in a first time window comprises: in a time interval limited by the first time window, monitoring the second signal.

In one embodiment, the behavior of monitoring a second signal comprises: detecting whether there exists the second signal on a channel occupied by the second signal.

In one embodiment, the behavior of monitoring a second signal comprises: monitoring the second signal.

In one embodiment, the behavior of monitoring a second signal comprises: detecting whether there exists the second signal through a Cyclic Redundancy Check (CRC) check.

In one embodiment, the behavior of monitoring a second signal comprises: detecting whether there exists the second signal through a blind detection.

In one embodiment, the behavior of monitoring a second signal comprises: detecting whether there exists the second signal through a coherent detection of a characteristic sequence.

In one embodiment, the behavior of monitoring a second signal comprises: when the second signal is detected, receiving the second signal.

In one embodiment, the behavior of monitoring a second signal comprises: monitoring a PDCCH.

In one embodiment, the second signal is monitored in the first time window.

In one embodiment, the second signal is not monitored in the first time window.

In one embodiment, the second signal is received.

In one embodiment, the second signal is not received.

In one embodiment, the first counter being greater than a first threshold comprises: a value of the first counter being greater than the first threshold.

In one embodiment, the first counter being greater than a first threshold comprises: the first counter is equal to the first threshold plus 1.

In one embodiment, the behavior of determining the first data transmission failure comprises: determining a transmission of Radio Link Failure (RLF).

In one embodiment, the behavior of determining the first data transmission failure comprises: determining an occurrence of a random access problem.

In one embodiment, the behavior of determining the first data transmission failure comprises: determining that the first data is not transmitted successfully.

In one embodiment, the behavior of determining the first data transmission failure comprises: determining an occurrence of an RLF, a cause of the RLF is a random access failure, and the cause of the random access failure is the first data transmission failure.

In one embodiment, when the first data transmission failure is determined, MAC layer transmits a random access problem indication to RRC layer.

In one embodiment,

In one embodiment, when it is determined that the first data transmission is failed, return to the first state.

In one embodiment, when it is determined that the first data transmission is failed, enter into RRC_IDLE state.

In one embodiment, the phrase of the first signal, the second signal and the third signal being used for a random access procedure comprises: the first signal, the second signal and the third signaling are a signal in the random access procedure.

In one embodiment, the phrase of the first signal, the second signal and the third signal being used for a random access procedure comprises: the first signal, the second signal and the third signal are respectively one of Message 1 (Msg1), or Msg2, or Msg3, or Msg4, or MsgA, or MsgB.

In one embodiment, the first signal, the second signal and the third signal belong to a same random access procedure.

In one embodiment, the first signal, the second signal and the third signal belong to different random access procedures.

In one embodiment, the first signal is used to trigger the second signal.

In one embodiment, the first signal being transmitted is used to determine monitoring the second signal.

In one embodiment, the phrase of the first signal and the third signal comprising a preamble sequence comprises: the first signal and the third signal respectively comprise a preamble sequence.

In one embodiment, the phrase of the first signal and the third signal comprising a preamble sequence comprises: the first signal at least comprises a preamble sequence, and the third signal at least comprises a preamble sequence.

In one embodiment, a preamble sequence in the first signal is different from a preamble sequence in the third signal.

In one embodiment, a preamble sequence in the first signal is the same as a preamble sequence in the third signal.

In one embodiment, the preamble sequence comprises a Preamble.

In one embodiment, the preamble sequence comprises a positive integer.

In one embodiment, the preamble sequence comprises a bit string.

In one embodiment, the first signal is transmitted via an air interface.

In one embodiment, the first signal is transmitted via an antenna port.

In one embodiment, the first signal is transmitted on a Physical Random Access Channel (PRACH).

In one embodiment, the first signal is transmitted on a PUSCH.

In one embodiment, the first signal comprises at least one of a PRACH or a PUSCH.

In one embodiment, the first signal comprises all or part of a Physical Layer signal.

In one embodiment, the first signal comprises all or part of an RRC message.

In one embodiment, the first signal comprises an Uplink (UL) signal.

In one embodiment, the second signal is transmitted via an air interface.

In one embodiment, the second signal is transmitted through an antenna port.

In one embodiment, the second signal comprises all or part of a Physical Layer signal.

In one embodiment, the second signal comprises all or part of a MAC layer signaling.

In one embodiment, the second signal comprises all or part of an RRC message.

In one embodiment, the second signal comprises a Downlink (DL) signal.

In one embodiment, the second signal comprises all or part of a MAC-layer signaling.

In one embodiment, the third signal is transmitted via an air interface.

In one embodiment, the third signal is transmitted through an antenna port.

In one embodiment, the third signal is transmitted on a PRACH.

In one embodiment, the third signal is transmitted on a PUSCH.

In one embodiment, the third signal comprises all or part of a Physical Layer signal.

In one embodiment, the third signal comprises an uplink signal.

In one embodiment, the message 1 comprises the preamble sequence.

In one embodiment, the message 2 comprises an RAR.

In one embodiment, the message 2 comprises a MAC subheader.

In one embodiment, the message 2 comprises a MAC sub-PDU.

In one embodiment, the message 2 comprises a PDCCH.

In one embodiment, the message comprises a Backoff Indicator, or an RAPID, or an RAPID and a MAC RAR.

In one embodiment, the message 2 comprises at least one of a Timing Advance Command (TAC), or UL Grant, or a Temporary C-RNTI (TC-RNTI).

In one embodiment, the message 3 comprises the first data.

In one embodiment, the message 3 comprises a CCCH SDU.

In one embodiment, the message 3 comprises a Buffer Status Report (BSR).

In one embodiment, the message 3 comprises a Cell Radio Network Temporary Identifier (C-RNTI) MAC CE.

In one embodiment, the message 3 is a fulll-RNTI.

In one embodiment, the message 3 is a shord-RNTI.

In one embodiment, the message 4 comprises a MAC subheader.

In one embodiment, the message 4 comprises a MAC CE.

In one embodiment, the message 4 comprises a UE Contention Resolution Identity MAC CE.

In one embodiment, the message A comprises the preamble sequence.

In one embodiment, the message A comprises all or part in the message 1 and all or part in the message 3.

In one embodiment, the message A comprises all or part in the message 1.

In one embodiment, the message B comprises all or part in the message 2 and all or part in the message 4.

In one embodiment, the message B comprises all or part in the message 2.

In one embodiment, the message B comprises an RAR.

In one embodiment, the message B comprises a MAC subheader.

In one embodiment, the message B comprises a MAC sub-PDU.

In one embodiment, the message comprises at least one of a Backoff Indicator, or a fallbackRAR, or a successRAR, or a MAC SDU for CCCH or DCCH or padding.

In one embodiment, a field in the message B is the same as a field in the message 2.

In one embodiment, a field in the message B is the same as a field in the message 4.

In one embodiment, a field in the message B is the same as a field in the message 2 as well as a field in the message 4.

In one embodiment, the first signal at least comprises a physical-layer signal.

In one embodiment, the first signal comprises an RRC-layer signal.

In one embodiment, the phrase of the first signal, the second signal and the third signal being used for a random access procedure comprises: the first signal, the second signal and the third signal being transmitted in a random access procedure.

In one embodiment, the random access procedure comprises a first-type random access procedure.

In one subembodiment of the embodiment, the first-type random access procedure comprises 2-stepRA procedure.

In one subembodiment of the above embodiment, the first-type random access procedure comprises at least one of the message A, or the message B.

In one subembodiment of the embodiment, the first signal comprises the message A, the second signal comprises message B, and the third signal comprises message A.

In one subembodiment of the embodiment, the first signal, the second signal and the third signal are used for the first-type random access procedure.

In one embodiment, the random access procedure comprises a second-type random access procedure.

In one subembodiment of the embodiment, the second-type random access procedure comprises 4-stepRA procedure.

In one subembodiment of the embodiment, the first signal, the second signal and the third signal are used for the second-type random access procedure.

In one subembodiment of the embodiment, the second-type random access procedure comprises at least one of the message 1, or the message 2, or the message 3, or the message 4.

In one subembodiment of the embodiment, the first signal comprises the message 1, the second signal comprises the message 2, and the third signal comprises message 1.

In one embodiment, the random access procedure comprises a first-type random access procedure and a second-type random access procedure.

In one subembodiment of the embodiment, the first signal and the second signal are used for the first-type random access procedure, and the third signal is used for the second-type random access procedure.

In one subembodiment of the embodiment, the first signal and the second signal are used for the second-type random access procedure, and the third signal is used for the first-type random access procedure.

In one subembodiment of the embodiment, the first signal comprises the message A, the second signal comprises the message B, and the third signal comprises message 1.

In one embodiment, the phrase that the first counter is used to count a number of transmission(s) of a preamble sequence comprises: a value of the first counter is equal to a number of transmission(s) of the preamble sequence.

In one embodiment, the phrase that the first counter is used to count a number of transmission(s) of a preamble sequence comprises: the first counter is updated with the increase of transmission time(s) of the preamble sequence.

In one embodiment, the phrase that the first counter is used to count a number of transmission(s) of a preamble sequence comprises: once a transmission of a preamble sequence fails, and the first counter is updated.

In one embodiment, the first counter comprises PREAMBLE_TRANSMISSION_COUNTER.

In one embodiment, the phrase that the second counter is used to count time(s) of the first step-size being increased comprises: when the first step-size is determined to be used, the second counter is updated.

In one embodiment, the phrase that the second counter is used to count time(s) of the first step-size being increased comprises: once the first step-size is increased, the second counter is updated.

In one embodiment, the phrase that the second counter is used to count time(s) of the first step-size being increased comprises: a value of the second counter is equal to a number of times that the first step-size is increased.

In one embodiment, the second counter comprises PREAMBLE_POWER_RAMPING_COUNTER.

In one embodiment, the phrase that a difference value of the second target power of the first target power is related to the first step-size comprises: a step-size of the second target power added on the basis of the first target power is the first step-size.

In one embodiment, the phrase that a difference value of the second target power of the first target power is related to the first step-size comprises: a difference value of the first power increment in the second target power and the first power increment in the first target power is equal to the first step-size.

In one embodiment, when the first signal is transmitted, and if the first counter is equal to 0, the first target power is unrelated to the first step-size.

In one embodiment, when the first signal is transmitted, and if the first counter is greater than 0, the first target power is related to the first step-size.

In one embodiment, the phrase that determining that the first data is transmitted in the first state is used to determine the first step-size comprises: when it is determined that the first data is transmitted in the first state, the first step-size is used.

In one embodiment, the phrase that determining that the first data is transmitted in the first state is used to determine the first step-size comprises: a size of the first step-size is related to transmitting the first data in the first state.

In one embodiment, the phrase that determining that the first data is transmitted in the first state is used to determine the first step-size comprises: the first step-size is specific to transmitting the first data in the first state.

In one embodiment, a size of the first step-size is unrelated to transmitting the first data in the first state, and is related to a first-type random access or a second-type random access.

In one embodiment, the first node in the present application determines that first data is transmitted in first state, selects a first step-size, transmits a first signal according to first target power, and the first signal is used for a first-type random access procedure; updates a first counter, the first counter is not greater than a first threshold; determines that first data is transmitted in a first state, selects a target step-size; determines that the second counter is updated, transmits a third signal according to second target power, and the third signal is used for a first-type random access procedure.

In one subembodiment of the embodiment, the first threshold is used to determine that first data is transmitted in first state and a maximum number of transmission(s) of a preamble sequence when the first signal is used for a first-type random access procedure.

In one subembodiment of the embodiment, the first step-size is the same as the target step-size.

In one subembodiment of the embodiment, the first step-size and the target step-size comprises a value of msgA-PreamblePowerRampingStep or xxx-msgA-PreamblePowerRampingStep.

In one embodiment, the first node in the present application determines that first data is transmitted in first state, selects a first step-size, transmits a first signal according to first target power, and the first signal is used for a first-type random access procedure; updates a first counter, the first counter is not greater than a first threshold; determines that first data is transmitted in first state, selects a target step-size; determines that the second counter is updated, transmits a third signal according to second target power, and the third signal is used for a second-type random access procedure.

In one subembodiment of the embodiment, the first threshold is used to determine that first data is transmitted in first state and a maximum number of transmission(s) of a preamble sequence when the third signal is used for a second-type random access procedure.

In one subembodiment of the embodiment, when the first counter is updated, the first counter is greater than a first sub-threshold, the first sub-threshold is used to determine that first data is transmitted in first state and a maximum number of transmission(s) of a preamble sequence when the first signal is used for a first-type random access procedure.

In one subsidiary embodiment of the subembodiment, the first counter being greater than a first sub-threshold refers to that a value of the first counter is equal to the first sub-threshold plus 1.

In one subsidiary embodiment of the above embodiment, the first threshold is greater than the first sub-threshold.

In one subsidiary embodiment of the above embodiment, the first threshold comprises xxx-msgA-TransMax, and the first sub-threshold comprises xxx-preambleTransMax.

In one subembodiment of the embodiment, the first step-size different from the target step-size.

In one subembodiment of the embodiment, the first step-size comprises a value of msgA-PreamblePowerRampingStep or a value of xxx-msgA-PreamblePowerRampingStep, and the target step-size comprises a value of powerRampingStep or a value of xxx-powerRampingStep.

In one embodiment, the first node in the present application determines that first data is transmitted in first state, selects a first step-size, transmits a first signal according to first target power, and the first signal is used for a first-type random access procedure; updates a first counter, the first counter is not greater than a first threshold; determines that first data is not transmitted in first state, selects a target step-size; determines that the second counter is updated, transmits a third signal according to second target power, and the third signal is used for a first-type random access procedure.

In one subembodiment of the embodiment, the first threshold is used to determine that first data is not transmitted in first state and a maximum number of transmission(s) of a preamble sequence when the third signal is used for a first-type random access procedure.

In one subembodiment of the embodiment, when the first counter is updated, the first counter is greater than a first sub-threshold.

In one subembodiment of the embodiment, the first threshold is greater than the first sub-threshold.

In one subembodiment of the embodiment, the first threshold comprises xxx-msgA-TransMax, and the first sub-threshold comprises msgA-TransMax.

In one subembodiment of the embodiment, the first threshold is greater than the first sub-threshold.

In one subembodiment of the embodiment, the first step-size is the same as the target step-size.

In one subembodiment of the embodiment, the first step-size and the target step-size comprises a value of msgA-PreamblePowerRampingStep.

In one subembodiment of the embodiment, the first step-size different from the target step-size.

In one subembodiment of the embodiment, the first step-size comprises a value of msgA-PreamblePowerRampingStep, and the target step-size comprises a value of xxx-msgA-PreamblePowerRampingStep.

In one embodiment, the first node in the present application determines that first data is transmitted in first state, selects a first step-size, transmits a first signal according to first target power, and the first signal is used for a first-type random access procedure; updates a first counter, the first counter is not greater than a first threshold; determines that first data is not transmitted in first state, selects a target step-size; determines that the second counter is updated, transmits a third signal according to second target power, and the third signal is used for a second-type random access procedure.

In one subembodiment of the embodiment, the first threshold is used to determine that first data is not transmitted in first state and a maximum number of transmission(s) of a preamble sequence when the third signal is used for a second-type random access procedure.

In one subembodiment of the embodiment, when the first counter is updated, the first counter is greater than a first sub-threshold.

In one subembodiment of the embodiment, the first threshold is greater than the first sub-threshold.

In one subembodiment of the embodiment, the first threshold comprises xxx-msgA-TransMax, and the first sub-threshold comprises preambleTransMax.

In one subembodiment of the embodiment, the first step-size different from the target step-size.

In one subembodiment of the embodiment, the first step-size comprises a value of msgA-PreamblePowerRampingStep or a value of xxx-msgA-PreamblePowerRampingStep, and the target step-size comprises a value of powerRampingStep.

In one embodiment, the first node in the present application determines that first data is transmitted in first state, selects a first step-size, transmits a first signal according to first target power, and the first signal is used for a second-type random access procedure; updates a first counter, the first counter is not greater than a first threshold; determines that first data is transmitted in first state, selects a target step-size; determines that the second counter is updated, transmits a third signal according to second target power, and the third signal is used for a second-type random access procedure.

In one subembodiment of the embodiment, the first threshold is used to determine that first data is transmitted in first state and a maximum number of transmission(s) of a preamble sequence when the first signal is used for a second-type random access procedure.

In one subembodiment of the embodiment, the first step-size is the same as the target step-size.

In one subembodiment of the embodiment, the first step-size and the target step-size comprise a value of powerRampingStep or a value of xxx-powerRampingStep.

In one embodiment, the first node in the present application determines that first data is transmitted in first state, selects a first step-size, transmits a first signal according to first target power, and the first signal is used for a second-type random access procedure; updates a first counter, the first counter is not greater than a first threshold; determines that first data is transmitted in first state, selects a target step-size; determines that the second counter is updated, transmits a third signal according to second target power, and the third signal is used for a first-type random access procedure.

In one subembodiment of the embodiment, the first threshold is used to determine that first data is transmitted in a first state and a maximum number of transmission(s) of a preamble sequence when the third signal is used for a first-type random access procedure.

In one subembodiment of the embodiment, when the first counter is updated, the first counter is greater than a second sub-threshold, the second sub-threshold is used to determine that first data is transmitted in first state and a maximum number of transmission(s) of a preamble sequence when the first signal is used for a second-type random access procedure.

In one subsidiary embodiment of the subembodiment, the first counter being greater than a second sub-threshold refers to that a value of the first counter is equal to the second sub-threshold plus 1.

In one subsidiary embodiment of the above embodiment, the first threshold is greater than the second sub-threshold.

In one subsidiary embodiment of the above embodiment, the first threshold comprises xxx-preambleTransMax, and the second sub-threshold comprises xxx-preambleTransMax.

In one subembodiment of the embodiment, the first step-size different from the target step-size.

In one subembodiment of the embodiment, the first step-size comprises a value of powerRampingStep or a value of xxx-powerRampingStep, and the target step-size comprises a value of msgA-PreamblePowerRampingStep or a value of xxx-msgA-PreamblePowerRampingStep.

In one embodiment, the first node in the present application determines that first data is transmitted in first state, selects a first step-size, transmits a first signal according to first target power, and the first signal is used for a second-type random access procedure; updates a first counter, the first counter is not greater than a first threshold; determines that first data is not transmitted in first state, selects a target step-size; determines that the second counter is updated, transmits a third signal according to second target power, and the third signal is used for a second-type random access procedure.

In one subembodiment of the embodiment, the first threshold is used to determine that first data is not transmitted in first state and a maximum number of transmission(s) of a preamble sequence when the third signal is used for a second-type random access procedure.

In one subembodiment of the embodiment, when the first counter is updated, the first counter is greater than a second sub-threshold.

In one subembodiment of the embodiment, the first threshold is greater than the second sub-threshold.

In one subembodiment of the embodiment, the first threshold comprises xxx-preambleTransMax, and the second sub-threshold comprises preambleTransMax.

In one subembodiment of the embodiment, the first step-size is the same as the target step-size.

In one subembodiment of the embodiment, the first step-size and the target step-size comprises a value of PowerRampingStep.

In one subembodiment of the embodiment, the first step-size different from the target step-size.

In one subembodiment of the embodiment, the first step-size comprises a value of xxx-powerRampingStep, and the target step-size comprises a value of powerRampingStep.

In one embodiment, the first node in the present application determines that first data is transmitted in first state, selects a first step-size, transmits a first signal according to first target power, and the first signal is used for a second-type random access procedure; updates a first counter, the first counter is not greater than a first threshold; determines that first data is not transmitted in first state, selects a target step-size; determines that the second counter is updated, transmits a third signal according to second target power, and the third signal is used for a first-type random access procedure.

In one subembodiment of the embodiment, the first threshold is used to determine that first data is not transmitted in first state and a maximum number of transmission(s) of a preamble sequence when the third signal is used for a first-type random access procedure.

In one subembodiment of the embodiment, when the first counter is updated, the first counter is greater than a second sub-threshold.

In one subembodiment of the embodiment, the first threshold is greater than the second sub-threshold.

In one subembodiment of the embodiment, the first threshold comprises xxx-preambleTransMax, and the second sub-threshold comprises msgA-TransMax.

In one subembodiment of the embodiment, the first step-size different from the target step-size.

In one subembodiment of the embodiment, the first step-size comprises a value of powerRampingStep or a value of xxx-powerRampingStep, and the target step-size comprises a value of msgA-PreamblePowerRampingStep.

In one embodiment, the xxx in the present application is to indicate that the IE or the field is used to transmit the first data in the first state, in both case.

In one subembodiment of the above embodiment, the xxx comprises sdt.

In one subembodiment of the above embodiment, the xxx comprises edt.

In one subembodiment of the above embodiment, the xxx comprises idt.

Embodiment 2

Figure 2:
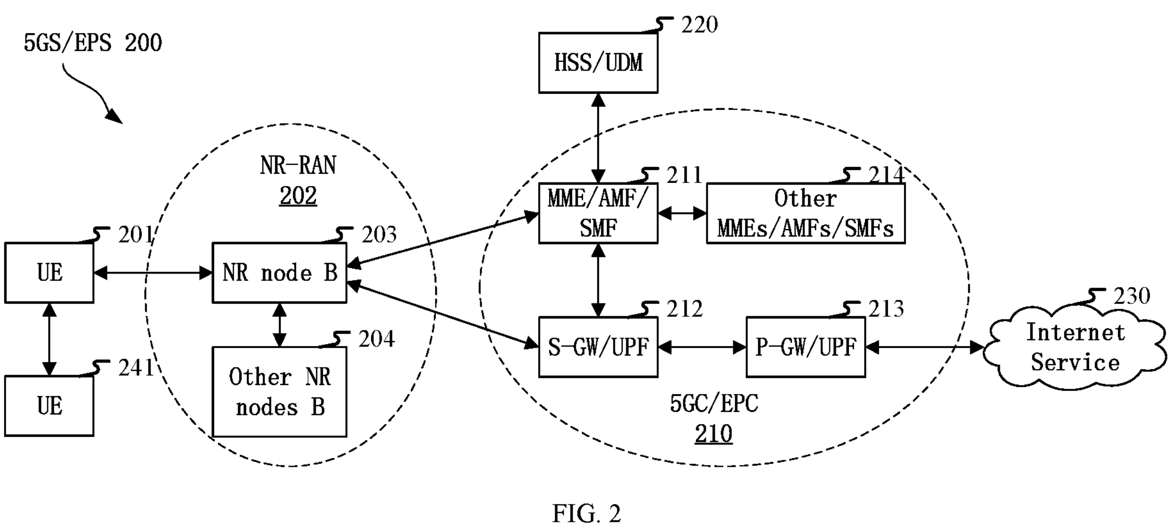
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Data Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 supports Non-Terrestrial Network (NTN) communications.

In one embodiment, the UE 201 supports communications within networks with large delay difference.

In one embodiment, the UE 201 supports Terrestrial Network (TN) communications.

In one embodiment, the UE 201 is a UE.

In one embodiment, the UE 201 is an aircraft.

In one embodiment, the UE 201 is a vehicle terminal.

In one embodiment, the UE 201 is a relay.

In one embodiment, the UE 201 is a vessel.

In one embodiment, the UE 201 is an IoT terminal.

In one embodiment, the UE 201 is an Industrial IoT terminal.

In one embodiment, the UE 201 is a device that supports transmission with low-latency and high-reliability.

In one embodiment, the gNB 203 corresponds to the second node in the present application.

In one embodiment, the gNB 203 supports communications within NTN.

In one embodiment, the gNB 203 supports communications within networks with large delay differences.

In one embodiment, the gNB 203 supports communications within TN.

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a UE.

In one embodiment, the gNB 203 is a gateway.

Embodiment 3

Figure 3:
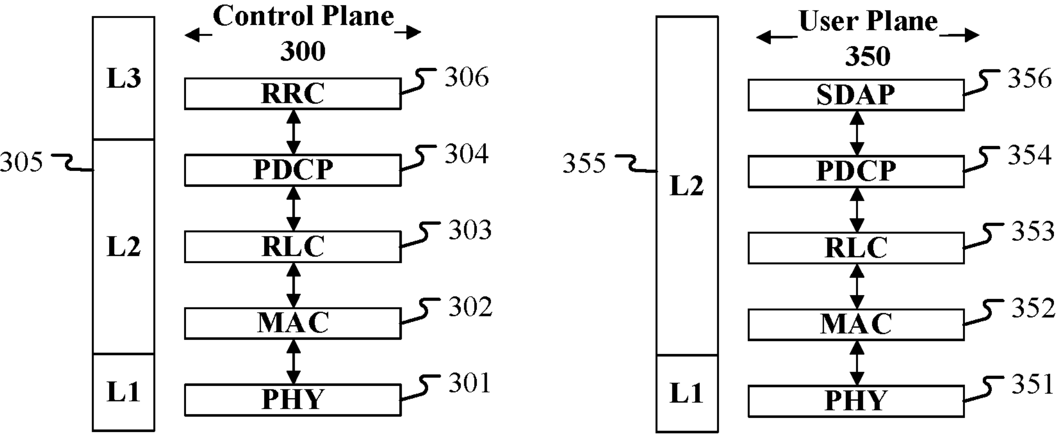
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present application. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the radio protocol architecture in FIG. 3 is applicable to the first node in the present application.

In one embodiment, the radio protocol architecture in FIG. 3 is applicable to the second node in the present application.

In one embodiment, the first signal in the present application is generated by the RRC 306.

In one embodiment, the first signal in the present application is generated by the MAC 302 or the MAC 352.

In one embodiment, the first signal in the present application is generated by the PHY 301 or the PHY 351.

In one embodiment, the second signal in the present application is generated by the RRC 306.

In one embodiment, the second signal in the present application is generated by the MAC 302 or the MAC 352.

In one embodiment, the second signal in the present application is generated by the PHY 301 or the PHY 351.

In one embodiment, the third signal in the present application is generated by the RRC 306.

In one embodiment, the third signal in the present application is generated by the MAC 302 or the MAC 352.

In one embodiment, the third signal in the present application is generated by the PHY 301 or the PHY 351.

In one embodiment, the first sub-data in the present application is generated by the RRC 306.

In one embodiment, the first sub-data in the present application is generated by the MAC 302 or the MAC 352.

In one embodiment, the first sub-data in the present application is generated by the PHY 301 or the PHY 351.

In one embodiment, the second sub-data in the present application is generated by the RRC 306.

In one embodiment, the second sub-data in the present application is generated by the MAC 302 or the MAC 352.

In one embodiment, the second sub-data in the present application is generated by the PHY 301 or the PHY 351.

In one embodiment, the first signaling in the present application is generated by the RRC 306.

In one embodiment, the first signaling in the present application is generated by the MAC 302 or the MAC 352.

In one embodiment, the first signaling in the present application is generated by the PHY 301 or the PHY 351.

In one embodiment, the second signaling in the present application is generated by the RRC 306.

In one embodiment, the second signaling in the present application is generated by the MAC 302 or the MAC 352.

In one embodiment, the second signaling in the present application is generated by the PHY 301 or the PHY 351.

In one embodiment, the third signaling in the present application is generated by the RRC 306.

In one embodiment, the third signaling in the present application is generated by the MAC 302 or the MAC 352.

In one embodiment, the third signaling in the present application is generated by the PHY 301 or the PHY 351.

Embodiment 4

Figure 4:
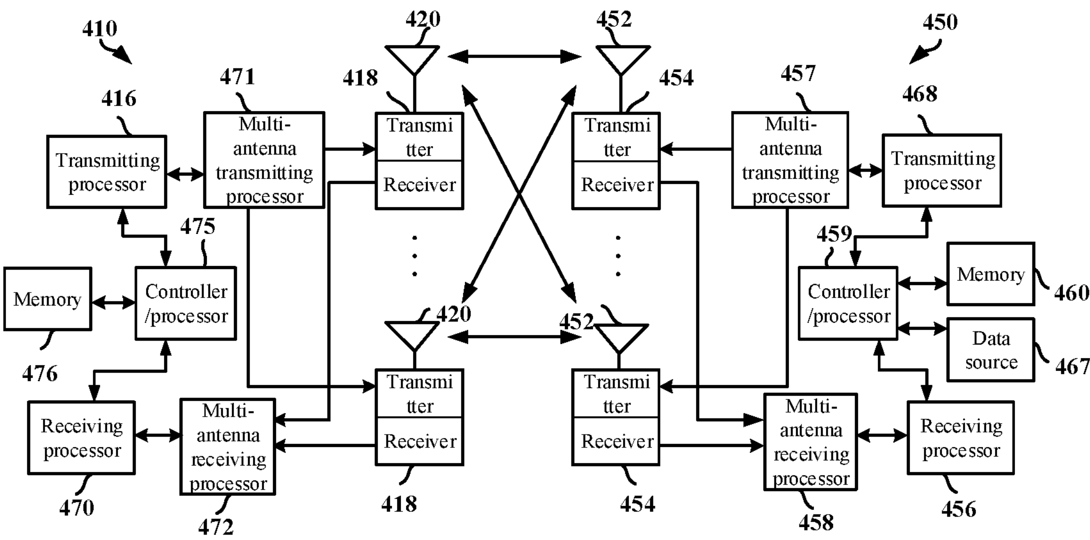
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. at least one processor and at least one memory. The at least one memory comprises computer program codes; the at least one memory and the computer program codes are configured to be used in collaboration with the at least one processor, the first communication device 450 at least: determines whether first data is transmitted in first state; when it is determined to transmit the first data in the first state, selects a first step-size, transmits a first signal according to first target power; updates a first counter; determines whether a second counter is updated; when the first counter is not greater than a first threshold, and determines that the second counter is updated, transmits a third signal according to second target power; when the first counter is greater than the first threshold, determines that the first data transmission is failed; monitors a second signal in a first time window; herein, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the first communication device 450 comprises at least one processor and at least one memory. a memory that stores a computer readable instruction program. The computer readable instruction program generates an action when executed by at least one processor. The action includes: determining whether to transmit first data in a first state; when it is determined to transmit the first data in the first state, selecting a first step-size, transmitting a first signal according to first target power; updating a first counter; determining whether to update a second counter; when the first counter is not greater than a first threshold, and determining to update the second counter, transmitting a third signal according to second target power; when the first counter is greater than the first threshold, determining that the first data transmission is failed; monitoring a second signal in a first time window; herein, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: receives a first signal; receives a third signal; and when the first signal is received, transmits a second signal; herein, when first data is determined to be transmitted in a first state, a first step-size is selected; the first signal is transmitted according to first target power; a first counter is updated; a second counter is determined whether it is updated; when the first counter is not greater than a first threshold, and the second counter is determined to be updated, the third signal is transmitted according to second target power; when the first counter is greater than the first threshold, a transmission of the first data is determined failed; the second signal is monitored in a first time window; the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the second communication device 410 comprises a memory that stores a computer readable instruction program. The computer readable instruction program generates an action when executed by at least one processor. The action includes: receiving a first signal; receiving a third signal; and when the first signal is received, transmitting a second signal; herein, when first data is determined to be transmitted in a first state, a first step-size is selected; the first signal is transmitted according to first target power; a first counter is updated; a second counter is determined whether it is updated; when the first counter is not greater than a first threshold, and the second counter is determined to be updated, the third signal is transmitted according to second target power; when the first counter is greater than the first threshold, a transmission of the first data is determined failed; the second signal is monitored in a first time window; the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the antenna 452, the receiver 454, the receiving processor 456, and the controller/processor 459 are used to monitor/receive a second signal; at least one of the antenna 420, the transmitter 418, the transmitting processor 416, or the controller/processor 475 is used to transmit a second signal.

In one embodiment, the antenna 452, the receiver 454, the receiving processor 456, and the controller/processor 459 are used to monitor/receive a second signal.

In one embodiment, the antenna 452, the transmitter 454, the transmitting processor 468, and the controller/processor 459 are used to transmit a first signal; at least one of the antenna 420, the receiver 418, the receiving processor 470, or the controller/processor 475 is used to receive a first signal.

In one embodiment, the antenna 452, the transmitter 454, the transmitting processor 468 and the controller/processor 459 are used to transmit a third signal; at least one of the antenna 420, the receiver 418, the receiving processor 470 or the controller/processor 475 is used to receive a third signal.

In one embodiment, the antenna 452, the transmitter 454, the transmitting processor 468, and the controller/processor 459 are used to transmit first sub-data; at least one of the antenna 420, the receiver 418, the receiving processor 470, or the controller/processor 475 is used to receive first sub-data.

In one embodiment, the antenna 452, the transmitter 454, the transmitting processor 468, and the controller/processor 459 are used to transmit second sub-data; at least one of the antenna 420, the receiver 418, the receiving processor 470, or the controller/processor 475 is used to monitor second sub-data.

In one embodiment, the antenna 452, the receiver 454, the receiving processor 456, the controller/processor 459 are used to receive a first signaling; at least one of the antenna 420, the transmitter 418, the transmitting processor 416, or the controller/processor 475 is used to transmit the first signaling.

In one embodiment, the antenna 452, the receiver 454, the receiving processor 456, and the controller/processor 459 are used to receive a second signaling; at least one of the antenna 420, the transmitter 418, the transmitting processor 416, or the controller/processor 475 is used to transmit a second signaling.

In one embodiment, the antenna 452, the receiver 454, the receiving processor 456, and the controller/processor 459 are used to receive a third signaling; at least one of the antenna 420, the transmitter 418, the transmitting processor 416, or the controller/processor 475 is used to transmit a third signaling.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a terminal.

In one embodiment, the first communication device 450 is a UE that supports large delay differences.

In one embodiment, the first communication device 450 is a UE that supports NTN.

In one embodiment, the first communication device 450 is an aircraft device.

In one embodiment, the first communication device 450 has positioning capability.

In one embodiment, the first communication device 450 does not have positioning capability.

In one embodiment, the first communication device 450 is a UE that supports TN.

In one embodiment, the second communication device 410 is a base station (gNB/eNB/ng-eNB).

In one embodiment, the second communication device 410 is a base station that supports large delay differences.

In one embodiment, the second communication device 410 is a base station that supports NTN.

In one embodiment, the second communication device 410 is a satellite equipment.

In one embodiment, the second communication device 410 is flying platform equipment.

In one embodiment, the second communication device 410 is a base station that supports TN.

Embodiment 5

Figure 5:
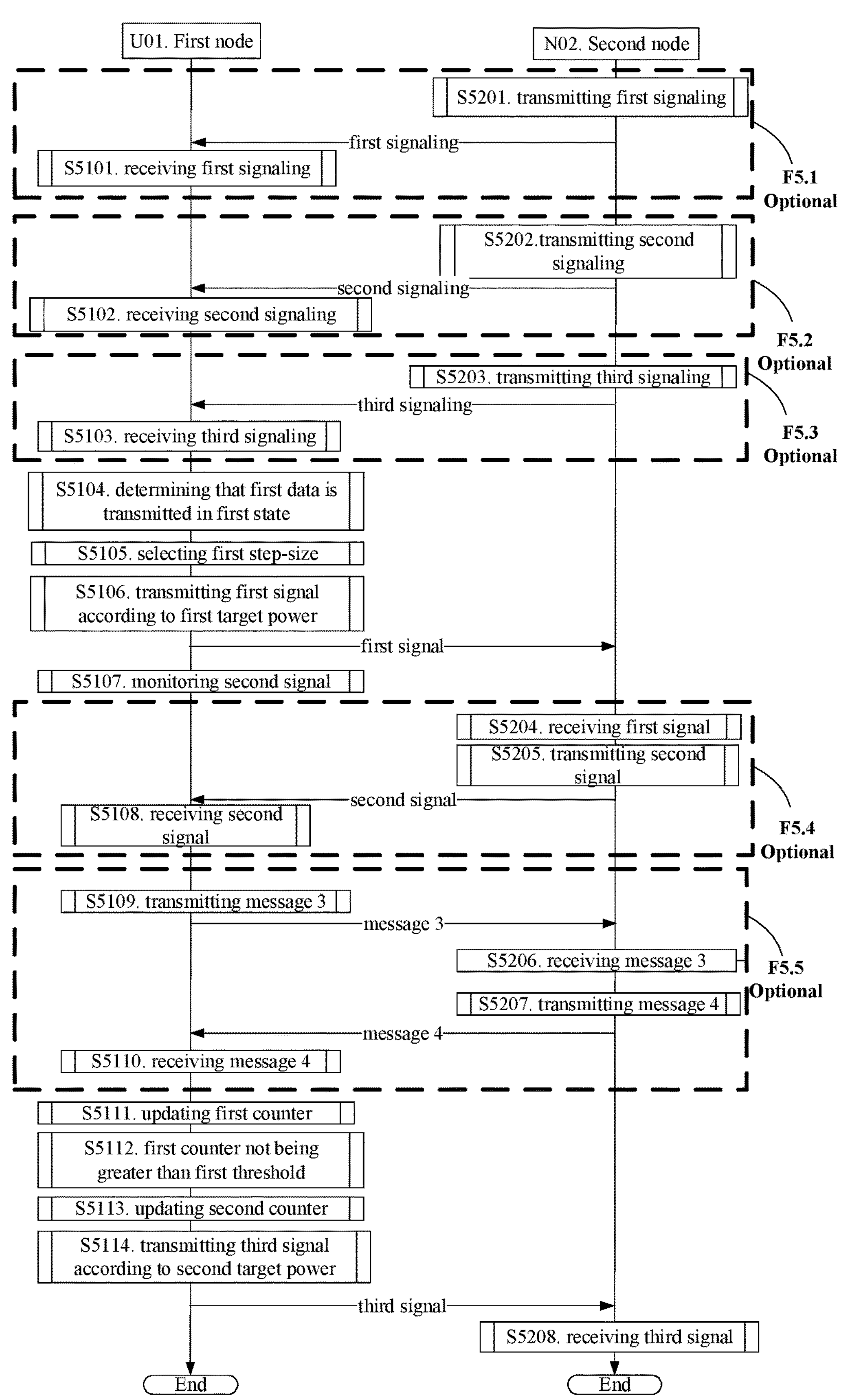
FIG. 5 illustrates a flowchart of radio signal transmission according to one embodiment of the present application.

Embodiment 5 illustrates a flowchart of radio signal transmission according to one embodiment in the present application, as shown in FIG. 5. A first node U01 is a UE; a second node N02 is a maintenance base station of a serving cell of the first node U01; it is particularly underlined that the order illustrated in the embodiment does not put constraints over sequences of signal transmissions and implementations.

The first node U01 receives a first signaling in step S5101; receives a second signaling in step S5102; receives a third signaling in step S5103; determines first data is transmitted in a first state in step S5104; in step S5105, when the first data is transmitted in the first state, selects a first step-size; in step S5106, transmits a first signal according to first target power; in step S5107, monitors a second signal in a first time window; in step S5108, receives the second signal; in step S5109, transmits message 3; in step S5110, receives message 4; in step S5111, updates a first counter; in step S5112, determines that the first counter is not greater than a first threshold; in step S5113, determines that a second counter is updated; in step S5114, transmits a third signal according to second target power.

The second node N02 transmits the first signaling in step S5201; in step S5202, transmits the second signaling; in step S5203, transmits the third signaling; in step S5204, receives the first signal; in step S5205, transmits the second signal; in step S5206, receives the message 3; in step S5207, transmits the message 4; in step S5208, receives the third signal.

In embodiment 5, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size; the first signaling indicates the first step-size; or the second signaling indicates a first offset and a second step-size, and a sum of the first offset and the second step-size is used to determine the first step-size; the third signaling is used to determine a first candidate preamble sequence sub-group, and the first signal comprises a preamble sequence in the first candidate preamble sequence sub-group.

In one embodiment, when the first counter is greater than the first threshold, it is determined that the first data transmission is failed.

In one embodiment, the phrase of the first signaling indicating the first step-size comprises: the first signaling is used to determine the first step-size.

In one embodiment, the phrase of the first signaling indicating the first step-size comprises: the first step-size is a field in the first signaling.

In one embodiment, the first signaling is transmitted via an air interface.

In one embodiment, the first signaling is transmitted through an antenna port.

In one embodiment, the first signaling is transmitted through a higher-layer signaling.

In one embodiment, the first signaling is transmitted through a higher-layer signaling.

In one embodiment, the first signaling comprises a Downlink (DL) signal.

In one embodiment, the first signaling comprises a sidelink signal.

In one embodiment, the first signaling comprises all or part of a high-layer signaling.

In one embodiment, the first signaling comprises all or part of a higher-layer signaling.

In one embodiment, the first signaling comprises an RRC message.

In one embodiment, the first signaling comprises all or partial IEs in an RRC Message.

In one embodiment, the first signaling comprises all or partial fields in an IE in an RRC message.

In one embodiment, the first signaling comprises an IE in an RRC message, and a name of the IE comprises RACH-ConfigGeneric.

In one embodiment, the first signaling comprises an IE in an RRC message, and a name of the IE comprises RACH-ConfigGenericTwoStepRA.

In one embodiment, the phrase that the second signaling indicates a first offset and a second step-size comprises: the second signaling comprises the first offset and the second step-size.

In one embodiment, the phrase that the second signaling indicates a first offset and a second step-size comprises: the first offset and the second step-size are respectively a field in the second signaling.

In one embodiment, the phrase that a sum of the first offset and the second step-size is used to determine the first step-size comprises: a sum of the first offset and the second step-size is equal to the first step-size.

In one embodiment, the phrase that a sum of the first offset and the second step-size is used to determine the first step-size comprises: a sum of the first offset and the second step-size is equal to the first step-size.

In one embodiment, the phrase that a sum of the first offset and the second step-size is used to determine the first step-size comprises: the first step-size is acquired through a calculation of the first offset and the second step-size.

In one embodiment, unit for measurement of the first offset comprises dB.

In one embodiment, the first offset comprises an integer number of dB(s).

In one embodiment, the first offset comprises 0 dB.

In one embodiment, the first offset comprises 2 dB.

In one embodiment, the first offset is configurable.

In one embodiment, the first offset is pre-configured.

In one embodiment, the first offset comprises a field in an RRC message, and a name of the field comprises xxx-powerRampingStepoffset.

In one embodiment, the first offset comprises a field in an RRC message, and a name of the field comprises xxx-msgA-PreamblePowerRampingStep.

In one embodiment, the first offset comprises a field in an RRC message, and a name of the field comprises xxx-powerRampingStepHighPriority.

In one embodiment, the first step-size is used to determine a Power-ramping factor.

In one embodiment, the first step-size is used to determine for a random access purpose other than transmitting the first data in the first state and when the second counter is updated, ramped power of the second target power relative to the first target power.

In one embodiment, the second step-size is used for 4-step random access.

In one embodiment, the second step-size is used for 2-step random access.

In one embodiment, unit for measurement of the second step-size comprises dB.

In one embodiment, the second step-size comprises a positive integer number of dB(s).

In one embodiment, the second step-size comprises one of 0 dB, 2 dB, 4 dB, or 6 dB.

In one embodiment, the second step-size comprises a field in an RRC message, and a name of the field comprises powerRampingStep.

In one embodiment, the second step-size comprises a field in an RRC message, and a name of the field comprises msgA-PreamblePowerRampingStep.

In one embodiment, the second step-size comprises a field in an RRC message, and a name of the field comprises powerRampingStepHighPriority.

In one embodiment, the second signaling is transmitted via an air interface.

In one embodiment, the second signaling is transmitted through an antenna port.

In one embodiment, the second signaling is transmitted through an upper-layer signaling.

In one embodiment, the second signaling is transmitted through a higher-layer signaling.

In one embodiment, the second signaling comprises a downlink signal.

In one embodiment, the second signaling comprises a sidelink signal.

In one embodiment, the second signaling comprises all or part of an upper-layer signaling.

In one embodiment, the second signaling comprises all or part of a higher-layer signaling.

In one embodiment, the second signaling comprises an RRC message.

In one embodiment, the second signaling comprises all or partial IEs in an RRC Message.

In one embodiment, the second signaling comprises all or partial fields in an IE of an RRC message.

In one embodiment, the second signaling comprises an IE in an RRC message, and a name of the IE comprises RACH-ConfigGeneric.

In one embodiment, the second signaling comprises an IE in an RRC message, and a name of the IE comprises RACH-ConfigGenericTwoStepRA.

In one embodiment, the second signaling comprises an IE in an RRC signaling, and a name of the IE comprises RA-Prioritization.

In one embodiment, the second signaling indicates a second step-size.

In one embodiment, the second signaling indicates the first offset.

In one embodiment, the third signaling is transmitted via an air interface.

In one embodiment, the third signaling is transmitted through an antenna port.

In one embodiment, the third signaling is transmitted through an upper-layer signaling.

In one embodiment, the third signaling is transmitted through a higher-layer signaling.

In one embodiment, the third signaling comprises a downlink signal.

In one embodiment, the third signaling comprises all or part of a high-layer signaling.

In one embodiment, the third signaling comprises all or part of a higher-layer signaling.

In one embodiment, the third signaling comprises an RRC message.

In one embodiment, the third signaling comprises all or partial IEs in an RRC Message.

In one embodiment, the third signaling comprises all or partial fields in an IE in an RRC message.

In one embodiment, the third signaling comprises an SIB1.

In one embodiment, the third signaling comprises an UplinkConfigCommon IE.

In one embodiment, the third signaling comprises an UplinkConfigCommonSIB IE.

In one embodiment, the third signaling comprises a BWP-Uplink IE.

In one embodiment, the third signaling comprises a BWP-UplinkCommon IE.

In one embodiment, the third signaling comprises a Cell-GroupConfig IE.

In one embodiment, the third signaling comprises an RACH-ConfigCommon IE.

In one embodiment, the third signaling comprises an RACH-ConfigCommonTwoStepRA IE.

In one embodiment, the third signaling comprises an RACH-ConfigDedicated IE.

In one embodiment, the third signaling comprises an RACH-ConfigGenericTwoStepRA IE.

In one embodiment, the third signaling comprises an RACH-ConfigGeneric IE.

In one embodiment, the third signaling comprises an SI-SchedulingInfo IE.

In one embodiment, the third signaling comprises a field in an RRC message, and a name of the field comprises msgA-PRACH-RootSequenceIndex.

In one embodiment, the third signaling comprises a field in an RRC message, and a name of the field comprises xxx-msgA-PRACH-RootSequenceIndex.

In one embodiment, the third signaling comprises a field in an RRC message, and a name of the field comprises PRACH-RootSequenceIndex.

In one embodiment, the third signaling comprises a field in an RRC message, and a name of the field comprises xxx-prach-RootSequenceIndex.

In one embodiment, the phrase that the third signaling is used to determine a first candidate preamble sequence sub-group comprises: the third signaling indicates the first candidate preamble sequence sub-group.

In one embodiment, the phrase that the third signaling is used to determine a first candidate preamble sequence sub-group comprises: the first candidate preamble sequence sub-group is configured through the third signaling.

In one embodiment, the phrase that the third signaling is used to determine a first candidate preamble sequence sub-group comprises: the first candidate preamble sequence sub-group can be calculated through the third signaling.

In one embodiment, the phrase that the third signaling is used to determine a first candidate preamble sequence sub-group comprises: the third signaling implicitly indicates the first candidate preamble sequence sub-group.

In one embodiment, the phrase that the third signaling is used to determine a first candidate preamble sequence sub-group comprises: the third signaling explicitly indicates the first candidate preamble sequence sub-group.

In one embodiment, the first candidate preamble sequence sub-group comprises at least one of time-domain resources, frequency-domain resources, or code-domain resources, or spatial-domain resources of a random access.

In one embodiment, the first candidate preamble sequence sub-group comprises a Preamble set.

In one embodiment, the first candidate preamble sequence sub-group comprises a resource set occupied by Preamble.

In one embodiment, the first candidate preamble sequence sub-group comprises Q1 preamble sequence(s), Q1 being a positive integer.

In one subembodiment of the above embodiment, for the first signal and the third signal, a value of Q1 is the same.

In one subembodiment of the above embodiment, for the first signal and the third signal, a value of Q1 is different.

In one embodiment, the first candidate preamble sequence sub-group comprises configuration of a preamble sequence of a random access.

In one embodiment, the first candidate preamble sequence sub-group comprises a preamble sequence set to which the first signal belongs.

In one embodiment, the first candidate preamble sequence sub-group comprises a preamble sequence set to which the third signal belongs.

In one embodiment, the first candidate preamble sequence sub-group to which the first signal belongs and the first candidate preamble sequence sub-group to which the third signal belongs are the same.

In one embodiment, the first candidate preamble sequence sub-group to which the first signal belongs and the first candidate preamble sequence sub-group to which the third signal belongs are different.

In one embodiment, the dotted box F5.1 is optional.

In one embodiment, the dotted box F5.2 is optional.

In one embodiment, the dotted box F5.3 is optional.

In one embodiment, the dotted box F5.4 is optional.

In one embodiment, the dotted box F5.5 is optional.

In one embodiment, at least one of the dotted boxes F5.1 or F5.2 exists.

In one embodiment, the dotted box F5. 3 exists.

In one embodiment, the dotted box F5. 3 does not exist.

In one embodiment, the presence of the dotted box F5.4 represents that at least one of the step S5108 or the step S5205 exists.

In one embodiment, the dotted box F5.4 not existing represents that neither the step S5108 nor the step S5205 exists.

In one embodiment, the presence of the dotted box F5.5 represents that at least one of the step S5109, the step S5110, the step S5206, or the step S5207 exists.

In one embodiment, the dotted box F5.5 not existing represents that none of the step S5109, the step S5110, the step S5206, and the step S5207 exists.

Embodiment 6

Figure 6:
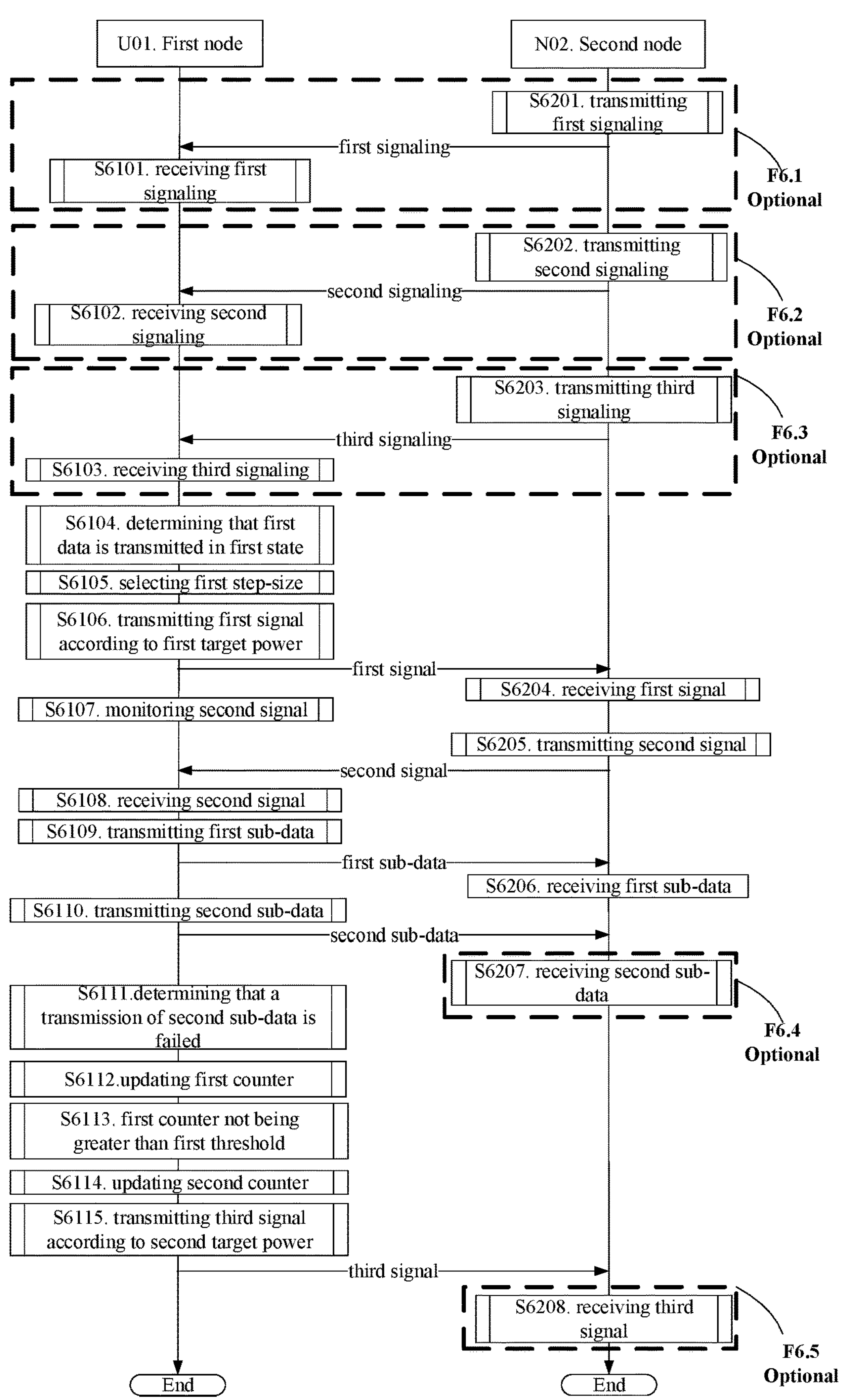
FIG. 6 illustrates a flowchart of radio signal transmission according to another embodiment of the present application.

Embodiment 6 illustrates a flowchart of radio signal transmission according to another embodiment of the present application, as shown in FIG. 6. A first node U01 is a UE; a second node N02 is a maintenance base station of a serving cell of the first node U01; it is particularly underlined that the order illustrated in the embodiment does not put constraints over sequences of signal transmissions and implementations.

The first node U01 receives a first signaling in step S6101; receives a second signaling in step S6102; receives a third signaling in step S6103; determines whether first data is transmitted in a first state in step S6104; in step S6105, when the first data is transmitted in the first state, selects a first step-size; in step S6106, transmits a first signal according to first target power; in step S6107, monitors a second signal in a first time window; in step S6108, receives the second signal; in step S6109, transmits first sub-data; in step S6110, transmits second sub-data; in step S6111, determines that a transmission of the first sub-data is successful, and determines that a transmission of the second sub-data is failed; in step S6112, updates a first counter; in step S6113, determines that the first counter is not greater than a first threshold; in step S6114, determines that a second counter is updated; in step S6115, transmits a third signal according to second target power.

The second node N02 transmits the first signaling in step S6201; in step S6202, transmits the second signaling; in step S6203, transmits the third signaling; in step S6204, receives the first signal; in step S6205, transmits the second signal; in step S6206, receives the first sub-data; in step S6207, receives the second sub-data; in step S6208, receives the third signal.

In embodiment 5, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size; the first signaling indicates the first step-size; or the second signaling indicates a first offset and a second step-size, and a sum of the first offset and the second step-size is used to determine the first step-size; the third signaling is used to determine a first candidate preamble sequence sub-group, the first signal comprises a preamble sequence in the first candidate preamble sequence sub-group; the first data comprises the first sub-data and the second sub-data; a transmission of the first sub-data being successful and a transmission of the second sub-data being failed are used to determine that a difference value of the second target power and the first target power is related to the first step-size.

In one embodiment, when the first counter is greater than the first threshold, it is determined that the first data transmission is failed.

In one embodiment, the phrase that the first data comprises the first sub-data and the second sub-data comprises: the first sub-data and the second sub-data are all of the first data.

In one embodiment, the phrase that the first data comprises the first sub-data and the second sub-data comprises: the first sub-data and the second sub-data are part of the first data.

In one embodiment, the first sub-data and the second sub-data are transmitted in different slots.

In one embodiment, confirming that a message is successfully received is used to determine that a transmission of the given data is successful, and the given data comprises the first sub-data or the second sub-data.

In one subembodiment of the embodiment, for the first sub-data and the second sub-data, there respectively exists a confirmation message.

In one subembodiment of the embodiment, for the first sub-data and the second sub-data, there exists a same confirmation message.

In one embodiment, the phrase that "a transmission of the first sub-data being successful and a transmission of the second sub-data being failed are used to determine that a difference value of the second target power and the first target power is related to the first step-size" comprises: when a transmission of the first sub-data is successful and a transmission of the second sub-data is failed, a difference value of the second target power and the first target power is related to the first step-size.

In one embodiment, the phrase that "a transmission of the first sub-data being successful and a transmission of the second sub-data being failed are used to determine that a difference value of the second target power and the first target power is related to the first step-size" comprises: when a transmission of part of the first data is successful, and a transmission of part of the first data is failed, a difference value of the second target power and the first target power is related to the first step-size.

In one embodiment, the phrase that "a transmission of the first sub-data being successful and a transmission of the second sub-data being failed are used to determine that a difference value of the second target power and the first target power is related to the first step-size" comprises: when a transmission of part of the first data is successful, and a transmission of part of the first data is failed, the first step-size is used.

In one embodiment, the phrase that "when a transmission of the first sub-data is successful, and a transmission of the second sub-data is failed" comprises: a confirmation message is received for the first sub-data, and a confirmation message is not received for the second sub-data.

In one embodiment, the phrase that "when a transmission of the first sub-data is successful, a transmission of the second sub-data is failed" comprises: receiving a confirmation message, the confirmation message indicates that a transmission of the first sub-data is successful, and a transmission of the second sub-data is failed.

In one embodiment, the first node U01 in the present application determines whether first data is transmitted in first state; when the first data being transmitted in the first state is determined, selects a first step-size and a candidate step-size, transmits a first signal according to first target power, and the first target power is related to the candidate step-size; updates a first counter; determines whether a second counter is updated; when the first counter is not greater than a first threshold, and determines that the second counter is updated, transmits a third signal according to second target power; when a transmission of the first sub-data is successful and a transmission of the second sub-data is failed, the second target power is related to the first step-size; when transmissions of both the first sub-data and the second sub-data are failed, the second target power is related to the candidate step-size.

In one subembodiment of the embodiment, the candidate step-size is unrelated to transmitting the first data in the first state, and the first step-size is related to transmitting the first data in the first state.

In one subembodiment of the embodiment, the candidate step-size comprises the second step-size.

In one subembodiment of the embodiment, the candidate step-size is unequal to the first step-size.

In one subembodiment of the embodiment, the phrase that the first target power is related to the candidate step-size comprises: calculating the first target power according to the candidate step-size.

In one subembodiment of the embodiment, the phrase that the second target power is related to the first step-size comprises: calculating the second target power according to the first step-size.

In one subembodiment of the embodiment, the phrase that the second target power is related to the candidate step-size comprises: calculating the first target power according to the candidate step-size.

In one embodiment, the dotted box F6.1 is optional.

In one embodiment, the dotted box F6.2 is optional.

In one embodiment, the dotted box F6.3 is optional.

In one embodiment, the dotted box F6.4 is optional.

In one embodiment, the dotted box F6.5 is optional.

In one embodiment, at least one of the dotted boxes F6.1 or F6.2 exists.

In one embodiment, the dotted box F6. 3 exists.

In one embodiment, the dotted box F6. 3 does not exist.

In one embodiment, the dotted box F6. 4 exists.

In one embodiment, the dotted box F6. 4 does not exist.

In one embodiment, the dotted box F6. 5 exists.

In one embodiment, the dotted box F6. 5 does not exist.

Embodiment 7

Embodiment 7 illustrates a flowchart of transmitting first data in a first state according to one embodiment of the present application.

In embodiment 7, the first node in the present application in step S7001, determines that first data is transmitted in a first state; in step S7002, when the first data is transmitted in the first state, selects a first step-size; in step S7003, transmits a first signal according to first target power; in step S7004, monitors a second signal in a first time window; in step S7005, judges whether a random access procedure is completed, when the random access procedure is completed, ends the current random access procedure, otherwise, enters into the step S7006; in step S7006, updates a first counter; in step S7007, judges whether a first counter is not greater than a first threshold, when a first counter is not greater than a first threshold, enters into the step S7008(*a*), otherwise, when a first counter is greater than a first threshold, enters into the step S7008(*b*); in step S7008(*a*), judges whether a condition of updating a second counter is satisfied, when a condition of updating the second counter is satisfied, enters into the step S7009(*a*), otherwise, enters into the step S7009(*b*); in step S7008(*b*), determines that a first data transmission is failed, and ends the current random access procedure; in step S7009(*a*), updates a second counter; in step S7010, transmits a third signal according to second target power, and returns to step S7005; in step S7009(*b*), transmits a third signal according to third target power, and returns to step S7005.

In one embodiment, the third target power is not increased with the first step-size compared with the first target power.

In one embodiment, the second target power is increased with the first step-size compared with the first target power.

In one embodiment, whether a random access procedure is completed is judged according to whether the first time window is expired.

In one subembodiment of the embodiment, when the first time window is expired, it is assumed that the random access procedure is not completed.

In one embodiment, the first data not being completely transmitted is used to determine that the random access procedure is not completed.

In one embodiment, the second signal not being successfully received is used to determine that the random access procedure is not completed.

In one embodiment, the message 3 or message B not being successfully received is used to determine that the random access procedure is not completed.

Embodiment 8

Figures 7, 8, 9:
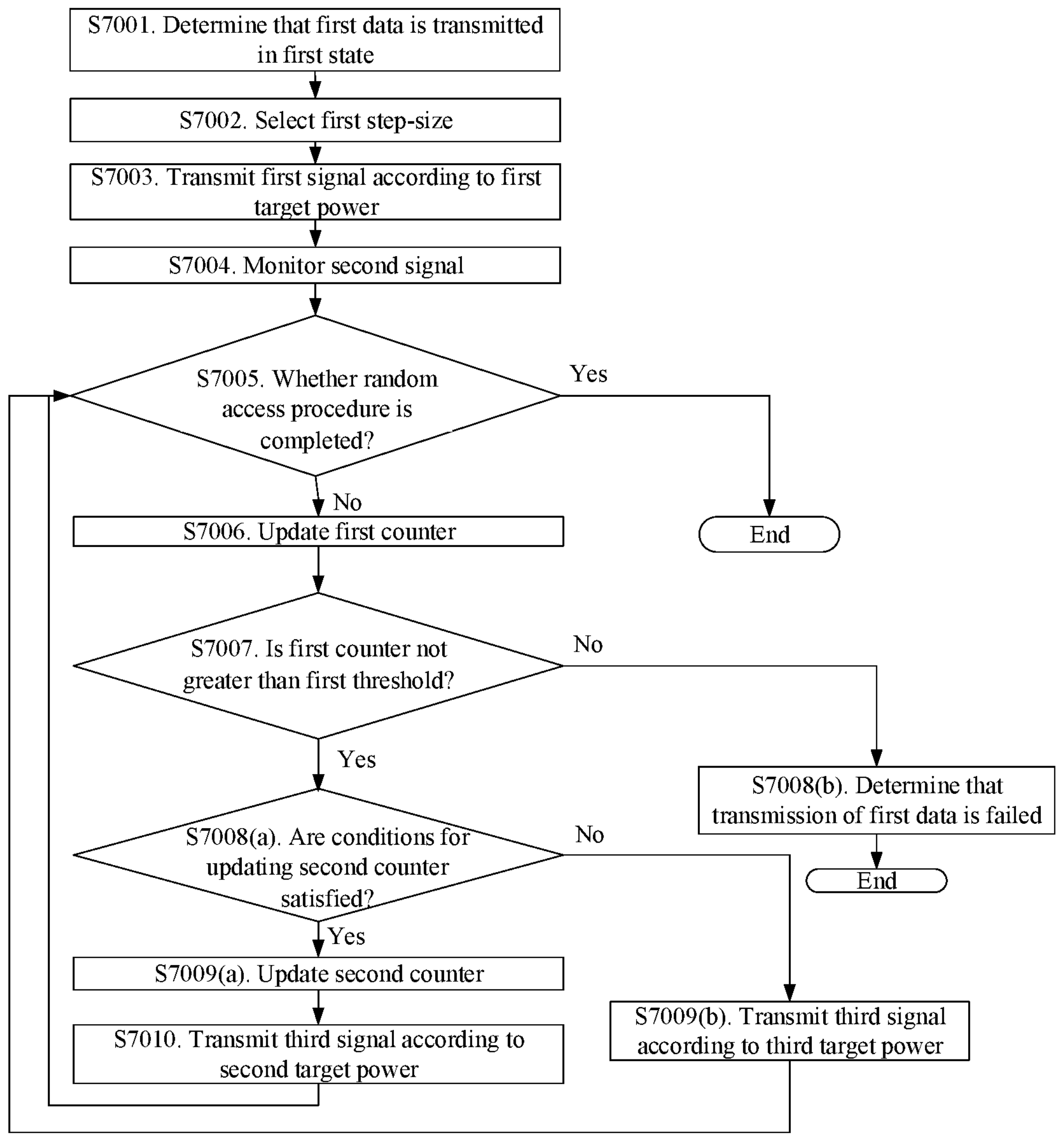
FIG. 7 illustrates a flowchart of transmitting first data in a first state according to one embodiment of the present application.
FIG. 8 illustrates a schematic diagram of a difference value of second target power and first target power being related to both a first step-size and a second offset according to one embodiment of the present application.
FIG. 9 illustrates a schematic diagram of a first field of a second signal being used to indicate whether first data is dropped to be transmitted in a first state according to one embodiment of the present application.

Embodiment 8 illustrates a schematic diagram of a difference value of second target power and first target power being related to both a first step-size and a second offset according to one embodiment of the present application, as shown in FIG. 8.

In embodiment 8, when the first signal is used for a first-type random access, and the third signal is used for a second-type random access, a difference value of the second target power and the first target power is also related to a second offset, a difference value of a first sub-step-size and a second sub-step-size as well as the first counter are used to determine the second offset, and the first sub-step-size and the second sub-step-size are respectively used to determine target power of the first-type random access and the second-type random access.

In one embodiment, the second offset comprises the first fallback power increment.

In one embodiment, the first step-size comprises MSGA_PREAMBLE_POWER_RAMPING_STEP or xxx_MSGA_PREAMBLE_POWER_RAMPING_STEP, the second sub-step-size comprises PREAMBLE_POWER_RAMPING_STEP or xxx_PREAMBLE_POWER_RAMPING_STEP.

In one embodiment, the first sub-step-size is used to calculate target receiving power of a preamble sequence of the first-type random access.

In one embodiment, the second sub-step-size is used to calculate target receiving power of a preamble sequence of the second-type random access.

Embodiment 9

Embodiment 9 illustrates a schematic diagram of a first field of a second signal being used to indicate whether first data is dropped to be transmitted in a first state according to one embodiment of the present application, as shown in FIG. 9.

In embodiment 9, the second signal comprises a first field, and the first field is used to indicate whether the first data is dropped to be transmitted in the first state.

In one embodiment, the second signal comprises an RAR.

In one embodiment, the second signal comprises a successRAR.

In one embodiment, the second signal comprises a fallbackRAR.

In one embodiment, the second signal comprises a MAC PDU.

In one embodiment, the second signal comprises a MAC SDU.

In one embodiment, the second signal comprises a MAC CE.

In one embodiment, the second signal comprises a MAC subheader.

In one embodiment, the second signal comprises a fallbackRAR and a subheader.

In one embodiment, the phrase that the second signal comprises a first field comprises: the first field is a field in the second signal.

In one embodiment, the phrase that the second signal comprises a first field comprises: the second signal carries the first data block.

In one embodiment, the phrase that the first field is used to indicate whether the first data is dropped to be transmitted in the first state comprises: the first field indicates a fallback random access type, the random access type comprises transmitting the first data in the first state, or not transmitting the first data in the first state.

In one embodiment, the phrase that the first field is used to indicate whether the first data is dropped to be transmitted in the first state comprises: the first field is used to determine whether the first data is dropped to be transmitted in the first state.

In one embodiment, the phrase that the first field is used to indicate whether the first data is dropped to be transmitted in the first state comprises: the first field explicitly indicates whether the first data is dropped to be transmitted in the first state.

In one subembodiment of the embodiment, the first field comprises P1 bit(s), the P1 bit(s) is(are) used to indicate dropping transmitting the first data in the first state, P1 being a positive integer.

In one subsidiary embodiment of the subembodiment, P1 is equal to 1.

In one subsidiary embodiment of the subembodiment, P1 is greater than 1.

In one subembodiment of the embodiment, the first field being set as a true value is used to indicate dropping transmitting the first data in the first state, the true value comprises 1, or is greater than 1, or true.

In one subembodiment of the embodiment, the first field being set as false value is used to indicate dropping transmitting the first data in the first state, the false value comprises 0 or false.

In one embodiment, the phrase that the first field is used to indicate whether the first data is dropped to be transmitted in the first state comprises: the first field implicitly indicates whether the first data is dropped to be transmitted in the first state.

In one subembodiment of the embodiment, when the first field exists, it is indicated that the first data is dropped in the first state.

In one subembodiment of the embodiment, when the first field does not exist, it is indicated that the first data is transmitted in the first state.

Embodiment 10

Embodiment 10 illustrates a schematic diagram of fallback of transmitting first data in a first state according to one embodiment of the present application, as shown in FIG. 10. In FIG. 10, the solid box represents that first data is transmitted in a first state and a first-type random access process is executed; the equal-length dashed box represents that first data is transmitted in a first state and a second-type random access procedure is executed; the single-dot dashed box represents that first data is not transmitted in a first state and a first-type random access procedure is executed; the double-dot dashed box represents that the first data is not transmitted in first state and a second-type random access procedure is executed.

In embodiment 10, the second signal comprises a first field, and the first field is used to indicate whether the first data is dropped to be transmitted in the first state.

In one embodiment, the solid box can fall back to one of equal-length dashed box, or single-dot dashed box, or double-dot dashed box.

In one embodiment, the equal-length dashed box can fall back to one of solid box, or single-dot dashed box, or double-dot dashed box.

In one embodiment, the first field comprises P1 bit(s), the P1 bit(s) is(are) used to indicate dropping transmitting the first data in the first state, P1 being a positive integer.

In one subembodiment of the above embodiment, P1 is equal to 2, and value(s) of the P1 bit(s) corresponds (respectively correspond) to the four boxes.

In one subembodiment of the embodiment, when the P1 is set as 00, it indicates that a random access procedure falls back to the solid box.

In one subembodiment of the embodiment, when the P1 is set as 01, it indicates that a random access procedure falls back to the equal-length dashed box.

In one subembodiment of the embodiment, when the P1 is set as 10, it indicates that a random access procedure falls back to the single-dot dashed box.

In one subembodiment of the embodiment, when the P1 is set as 11, it indicates that a random access procedure falls back to the double-dot dashed box.

In one embodiment, the first signal is used for a first-type random access, and the third signal is used for a second-type random access.

In one subembodiment of the embodiment, the first field is used to indicate falling back to the second-type random access procedure.

In one embodiment, the meaning of the fallback comprises that the first counter does not reach a maximum value.

In one embodiment, the meaning of the fallback comprises that the first signal and the third signal belong to a same random access procedure.

Embodiment 11

Embodiment 11 illustrates a schematic diagram of determining that first data is transmitted in a first state being related to select a first candidate preamble sequence subgroup according to one embodiment of the present application, as shown in FIG. 11.

In embodiment 11, the first node in the present application receives a third signaling; herein, the third signaling is used to determine a first candidate preamble sequence sub-group, determining to transmit the first data in the first state is related to the first candidate preamble sequence sub-group, the first candidate preamble sequence sub-group is one of N1 first-type preamble sequence sub-group(s), N1 being a positive integer greater than 1; the first signal comprises a preamble sequence in the first candidate preamble sequence sub-group.

In one embodiment, the phrase that determining that the first data is transmitted in the first state is related to select a first candidate preamble sequence sub-group comprises: the first candidate preamble sequence sub-group is specific for transmitting the first data in the first state.

In one embodiment, the phrase that determining that the first data is transmitted in the first state is related to select a first candidate preamble sequence sub-group comprises: the first candidate preamble sequence sub-group is used to indicate transmitting the first data in the first state.

In one embodiment, the phrase that determining that the first data is transmitted in the first state is related to select a first candidate preamble sequence sub-group comprises: when it is determined that the first data is transmitted in the first state, the first candidate preamble sequence sub-group is selected.

In one embodiment, the phrase that determining that the first data is transmitted in the first state is related to select a first candidate preamble sequence sub-group comprises: when it is determined that the first data is not transmitted in the first state, the first candidate preamble sequence subgroup is not selected.

In one embodiment, the phrase that the first candidate preamble sequence sub-group is one of N1 first-type preamble sequence subgroup(s) comprises: a preamble sequence is divided into the N1 first-type preamble sequence sub-group(s), all or part of the N1 first-type preamble sequence sub-group(s) is(are) different, and one of the N1 first-type preamble sequence sub-group(s) is the first candidate preamble sequence sub-group.

In one embodiment, the phrase that the first candidate preamble sequence sub-group is one of N1 first-type preamble sequence subgroup(s) comprises: N1 first-type preamble sequence sub-group(s) comprises (comprise) the first candidate preamble sequence sub-group.

In one embodiment, the N1 is a positive integer greater than 1.

In one embodiment, the N1 is equal to 2.

In one embodiment, the N1 is equal to 4.

In one embodiment, N1 is related to a characteristic of a preamble sequence of a random access.

In one embodiment, the phrase that the first signal comprises a preamble sequence in the first candidate preamble sequence sub-group comprises: the first signal carries a preamble sequence, and the preamble sequence is selected from the first candidate preamble sequence sub-group.

In one embodiment, the phrase that the first signal comprises a preamble sequence in the first candidate preamble sequence sub-group comprises: the first signal carries a preamble sequence, and the preamble sequence belongs to the first candidate preamble sequence sub-group.

In one embodiment, a first candidate preamble sequence sub-group that the first signal is used for a first-type random access procedure is different from a first candidate preamble sequence sub-group that the first signal is used for a second-type random access procedure.

In one embodiment, any first-type preamble sequence sub-group comprises a positive integer number of preamble sequence(s).

In one embodiment, any preamble sequence in a first-type preamble sequence sub-group is different from any preamble sequence in another first-type preamble sequence sub-group.

In one embodiment, a preamble sequence in a first-type preamble sequence sub-group is the same as a preamble sequence in another first-type preamble sequence sub-group.

In one embodiment, there at least exists one preamble sequence being different in all preamble sequences in a first-type preamble sequence sub-group and all preamble sequences in another first-type preamble sequence sub-group.

In one embodiment, the phrase of the first candidate preamble sequence sub-group being one of the N1 first-type preamble sequence sub-group(s) comprises: one of the N1 first-type preamble sequence sub-group(s) is the first candidate preamble sequence sub-group, N1 being a positive integer.

Embodiment 12

Embodiment 12 illustrates a schematic diagram of N1 first-type preamble sequence sub-group(s) according to one embodiment of the present application, as shown in FIG. 12. In FIG. 12, four solid ellipses respectively represent four first-type preamble sequence sub-groups, the solid ellipse represents first-type preamble sequence sub-group #1, the equal-length dashed ellipse represents first-type preamble sequence sub-group #2, the single-dot dashed ellipse represents first-type preamble sequence sub-group #3, and the double-dot dashed ellipse represents first-type preamble sequence sub-group #4.

In one embodiment, there exists an overlapping part between two ellipses representing that two first-type preamble sequence sub-group have a same preamble sequence.

In one embodiment, there exists no overlapping part in the two ellipses representing that two first-type preamble sequence sub-groups do not have a same preamble sequence.

In one embodiment, a first candidate preamble sequence sub-group is a preamble sequence sub-group among N1 first-type preamble sequence subgroup(s).

In one embodiment, N1 is equal to 4.

In one embodiment, whether the first data is transmitted in the first state and a random access type are used to determine four first-type preamble sequence sub-groups.

In one subembodiment of the embodiment, when it is determined to transmit the first data in the first state, and the random access type is a first-type random access procedure, a preamble sequence used for a random access procedure is a preamble sequence in a first one of first-type preamble sequence sub-groups, and the first candidate preamble sequence sub-group comprises the first one of first-type preamble sequence sub-groups.

In one subembodiment of the embodiment, when it is determined to transmit the first data in the first state, and the random access type is a second-type random access procedure, a preamble sequence used for a random access procedure is a preamble sequence in a second one of first-type preamble sequence sub-groups, and the first candidate preamble sequence sub-group comprises the second one of first-type preamble sequence sub-groups.

In one subembodiment of the embodiment, when it is determined not to transmit the first data in the first state, and the random access type is a first-type random access procedure, a preamble sequence used for a random access procedure is a preamble sequence in a third one of first-type preamble sequence sub-groups.

In one subembodiment of the embodiment, when it is determined not to transmit the first data in the first state, and the random access type is a second-type random access procedure, a preamble sequence used for a random access procedure is a preamble sequence in a fourth one of first-type preamble sequence sub-groups.

In one subembodiment of the embodiment, the first one of first-type preamble sequence sub-groups, the second one of first-type preamble sequence sub-groups, the third one of first-type preamble sequence sub-groups and the fourth one of first-type preamble sequence sub-groups are respectively a first-type preamble sequence sub-group among first-type preamble sequence sub-group #1, first-type preamble sequence sub-group #2, first-type preamble sequence sub-group #3 and first-type preamble sequence sub-group #4.

In one embodiment, the FIG. 12 is only to illustrate that same preamble sequences can exist in two first-type preamble sequence sub-groups, and whether same preamble sequences exist in any two first-type preamble sequence sub-groups is not limited.

In one subembodiment of the above embodiment, two of the four first-type preamble sequence sub-groups have a same preamble sequence.

In one subembodiment of the above embodiment, two of the four first-type preamble sequence sub-groups do not have a same preamble sequence.

In one subembodiment of the above embodiment, any two first-type preamble sequence sub-groups do not have a same preamble sequence.

Embodiment 13

Embodiment 13 illustrates a structure block diagram of a processor in a first node according to one embodiment of the present application, as shown in FIG. 13. In FIG. 13, a processor 1300 of a first node comprises a first receiver 1301 and a first transmitter 1302.

The first transmitter 1302 determines whether first data is transmitted in a first state; when it is determined that the first data is transmitted in the first state, selects a first step-size, transmits a first signal according to first target power; updates a first counter; determines whether a second counter is updated; when the first counter is not greater than a first threshold, and determines that the second counter is updated, transmits a third signal according to second target power; when the first counter is greater than the first threshold, determines that a transmission of the first data is failed;

the first receiver 1301, monitors a second signal in a first time window;

In embodiment 13, the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the first receiver 1301, receives a first signaling; herein, the first signaling indicates the first step-size.

In one embodiment, the first receiver 1301 receives a second signaling; herein, the second signaling indicates a first offset and a second step-size, and a sum of the first offset and the second step-size is used to determine the first step-size.

In one embodiment, the first transmitter 1302 transmits first sub-data; transmits second sub-data; the first receiver 1301 determines that a transmission of the first sub-data is successful, and a transmission of the second sub-data is failed; herein, the first data comprises the first sub-data and the second sub-data; a transmission of the first sub-data being successful and a transmission of the second sub-data being failed are used to determine that a difference value of the second target power and the first target power is related to the first step-size.

In one embodiment, when the first signal is used for a first-type random access, and the third signal is used for a second-type random access, a difference value of the second target power and the first target power is also related to a second offset, a difference value of a first sub-step-size and a second sub-step-size as well as the first counter are used to determine the second offset, and the first sub-step-size and the second sub-step-size are respectively used to determine target power of the first-type random access and the second-type random access.

In one embodiment, the second signal comprises a first field, and the first field is used to indicate whether the first data is dropped to be transmitted in the first state.

In one embodiment, the first receiver 1301 receives a third signaling; herein, the third signaling is used to determine a first candidate preamble sequence sub-group, determining to transmit the first data in the first state is related to the first candidate preamble sequence sub-group, the first candidate preamble sequence sub-group is one of N1 first-type preamble sequence sub-group(s), N1 being a positive integer greater than 1; the first signal comprises a preamble sequence in the first candidate preamble sequence sub-group.

In one embodiment, the first receiver 1301 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1301 comprises the antenna 452, the receiver 454, the multi-antenna receiving processor 458 and the receiving processor 456 in FIG. 4 of the present application.

In one embodiment, the first receiver 1301 comprises the antenna 452, the receiver 454 and the receiving processor 456 in FIG. 4 of the present application.

In one embodiment, the first transmitter 1302 comprises the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1302 comprises the antenna 452, the transmitter 454, the multi-antenna transmitting processor 457 and the transmitting processor 468 in FIG. 4 of the present application.

In one embodiment, the first transmitter 1302 comprises the antenna 452, the transmitter 454 and the transmitting processor 468 in FIG. 4 of the present application.

Embodiment 14

Embodiment 14 illustrates a structure block diagram of a processor in a second node according to one embodiment of the present application, as shown in FIG. 14. In FIG. 14, a processor 1400 of the second node comprises a second transmitter 1401 and a second receiver 1402.

The second receiver 1402 receives a first signal; receives a third signal;

the second transmitter 1401, when the first signal is received, transmits a second signal;

in embodiment 14, when first data is determined to be transmitted in a first state, a first step-size is selected; the first signal is transmitted according to first target power; a first counter is updated; a second counter is determined whether it is updated; when the first counter is not greater than a first threshold, and the second counter is determined to be updated, the third signal is transmitted according to second target power; when the first counter is greater than the first threshold, a transmission of the first data is determined failed; the second signal is monitored in a first time window; the first state comprises RRC_INACTIVE State; the first data comprises a small data packet; the first time window comprises a positive integer number of slot(s); the first signal, the second signal and the third signal are used for a random access procedure, and the first signal and the third signal comprise a preamble sequence; the first counter is used to count a number of transmission(s) of a preamble sequence; the second counter is used to count a number of time(s) the first step-size is increased; a difference value between the second target power and the first target power is related to the first step-size, determining to transmit the first data in the first state is used to determine the first step-size.

In one embodiment, the second transmitter 1401 transmits a first signaling; herein, the first signaling indicates the first step-size.

In one embodiment, the second transmitter 1401 transmits a second signaling; herein, the second signaling indicates a first offset and a second step-size, and a sum of the first offset and the second step-size is used to determine the first step-size.

In one embodiment, the second receiver 1402 monitors first sub-data; monitors second sub-data; herein, the first sub-data is determined to be transmitted successful, and the second sub-data is determined to be transmitted failed; the first data comprises the first sub-data and the second sub-data; a transmission of the first sub-data being successful and a transmission of the second sub-data being failed are used to determine that a difference value of the second target power and the first target power is related to the first step-size.

In one embodiment, when the first signal is used for a first-type random access, and the third signal is used for a second-type random access, a difference value of the second target power and the first target power is also related to a second offset, a difference value of a first sub-step-size and a second sub-step-size as well as the first counter are used to determine the second offset, and the first sub-step-size and the second sub-step-size are respectively used to determine target power of the first-type random access and the second-type random access.

In one embodiment, the second signal comprises a first field, and the first field is used to indicate whether the first data is dropped to be transmitted in the first state.

In one embodiment, the second transmitter 1401 transmits a third signaling; herein, the third signaling is used to determine a first candidate preamble sequence sub-group, determining that the first data is transmitted in the first state is related to the first candidate preamble sequence sub-group, and the first candidate preamble sequence sub-group is one of N1 first-type preamble sequence sub-group(s), N1 being a positive integer; the first signal comprises a preamble sequence in the first candidate preamble sequence sub-group.

In one embodiment, the second transmitter 1401 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1401 comprises the antenna 420, the transmitter 418, the multi-antenna transmitting processor 471 and the transmitting processor 416 in FIG. 4 of the present application.

In one embodiment, the second transmitter 1401 comprises the antenna 420, the transmitter 418 and the transmitting processor 416 in FIG. 4 of the present application.

In one embodiment, the second receiver 1402 comprises the antenna 420, the receiver 418, the multi-antenna receiving processor 472, the receiving processor 470, the controller/processor 475 and the memory 476 in FIG. 4 of the present application.

In one embodiment, the second receiver 1402 comprises the antenna 420, the receiver 418, the multi-antenna receiving processor 472 and the receiving processor 470 in FIG. 4 of the present application.

In one embodiment, the second receiver 1402 comprises the antenna 420, the receiver 418 and the receiving processor 470 in FIG. 4 of the present application.

Embodiment 15

Figure 15:
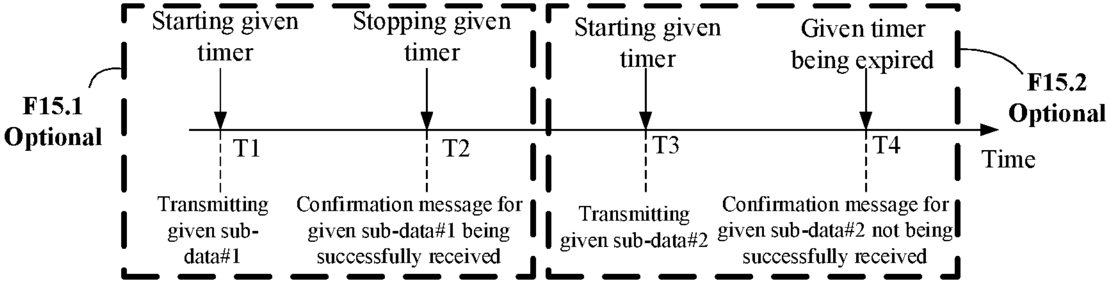
FIG. 15 illustrates a schematic diagram of a given timer according to one embodiment of the present application.

Embodiment 15 illustrates a schematic diagram of a given timer according to one embodiment of the present application, as shown in FIG. 15. The horizontal axis represents time, T1, T2, T3 and T4 respectively represent four times or time intervals; at T1, when given sub-data #1 is transmitted, start a given timer; at T2, when a confirmation message for given sub-data #1 is successfully received, stop a given timer; at T3, when given sub-data #2 is transmitted, start a given timer; at T4, a given timer is expired and a confirmation message for given sub-data #2 is not successfully received.

In embodiment 15, the given timer is used to determine a maximum transmission time of one of the M1 first-type sub-data of the first data.

In one embodiment, the sub-data comprises the first sub-data.

In one embodiment, the sub-data comprises the second sub-data.

In one embodiment, the given timer comprises a positive integer number of slot(s).

In one embodiment, a start time of the given timer comprises a time when the given sub-data is transmitted.

In one embodiment, a start time of the given timer comprises a certain time after the given sub-data is transmitted.

In one embodiment, when the given sub-data is received, the given timer is stopped.

In one embodiment, when the given timer is expired, a transmission of the given sub-data is determined failed.

In one embodiment, the given sub-data #1 is a sub-data of M1 first-type sub-data of the first data.

In one embodiment, the given sub-data #2 is a sub-data of M1 first-type sub-data of the first data.

In one embodiment, the first sub-data comprises the given sub-data #1, and the second sub-data comprises the given sub-data #2.

In one embodiment, the phrase of "when a transmission of the first sub-data is successful, and a transmission of the second sub-data is failed" comprises: for the first sub-data, a confirmation message is received within a given timer, and for the second sub-data, the given timer is expired.

In one embodiment, the confirmation message comprises a PDCCH.

In one embodiment, the confirmation message comprises a MAC CE.

In one embodiment, the confirmation message comprises an RRC message.

In one embodiment, the confirmation message comprises a bit.

In one embodiment, the confirmation message being set as 1 represents that a transmission of the given sub-message is successful.

In one embodiment, the confirmation message being set as 0 represents that a transmission of the given sub-message is failed.

In one embodiment, the dotted box F15.1 is optional.

In one embodiment, the dotted box F15.2 is optional.

In one embodiment, at least one of the dotted boxes F15.1 and F15.2 exists.

Embodiment 16

Figure 16:
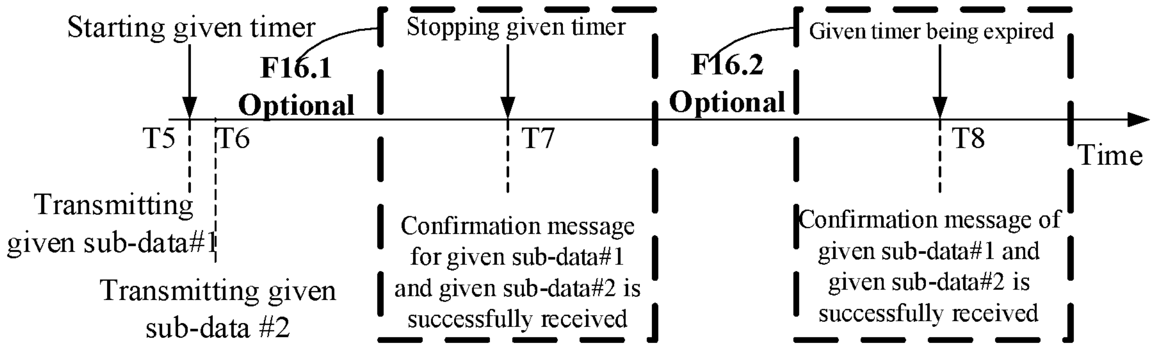
FIG. 16 illustrates a schematic diagram of a given timer according to another embodiment of the present application.

Embodiment 16 illustrates a schematic diagram of a given timer according to another embodiment of the present application, as shown in FIG. 16. The horizontal axis represents time, and T5, T6, T7 and T8 respectively represent four times or time intervals; at T5, when given sub-data is transmitted, start a given timer; at T6, transmit given sub-data #2; at T7, when a confirmation message for given sub-data #1 and given sub-data #2 is successfully received, stop a given timer; at T8, a given timer is expired, and a confirmation message for given sub-data #1 and given sub-data #2 is not successfully received.

In embodiment 16, the given timer is used to determine a maximum transmission time of the M1 first-type sub-data of the first data.

In one embodiment, a non-negative integer number of ms(s) is(are) comprised between the T5 and the T6.

In one embodiment, the phrase that a confirmation message for given sub-data #1 and given sub-data #2 is successfully received comprises: a confirmation message for the given sub-data #1 and the given sub-data #2 indicates that a transmission is successful.

In one embodiment, the phrase that a confirmation message for given sub-data #1 and given sub-data #2 is successfully received comprises: a confirmation message for the given sub-data #1 indicates that a transmission is successful, and a confirmation message for the given sub-data #2 indicates that a transmission is failed.

In one embodiment, the phrase that a confirmation message for given sub-data #1 and given sub-data #2 is successfully received comprises: a confirmation message for the given sub-data #1 indicates that a transmission is failed, and a confirmation message for the given sub-data #2 indicates that a transmission is successful.

In one embodiment, the phrase that a confirmation message for given sub-data #1 and given sub-data #2 is not successfully received comprises: not monitoring a confirmation message.

In one embodiment, when the given timer is expired, it is determined that transmissions of the first sub-data #1 and the second sub-data #2 are failed.

In one embodiment, the confirmation message comprises a bitmap.

In one subembodiment of the above embodiment, the bitmap comprises M1 bit(s), M1 being a positive integer.

In one subembodiment of the above embodiment, the M1 bit(s) is (are respectively) confirmed for the M1 first-type sub-data.

In one subembodiment of the above embodiment, any bit in the bitmap corresponds to first-type sub-data.

In one subembodiment of the above embodiment, any bit in the bitmap being set as 1 represents a transmission of corresponding first-type sub-data is successful.

In one subembodiment of the above embodiment, any bit in the bitmap being set as 0 represents a transmission of corresponding first-type sub-data is failed.

In one embodiment, the dotted box F16.1 is optional.

In one embodiment, the dotted box F16.2 is optional.

In one embodiment, one of dotted box F16.1 and dotted box F16.2 exists.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE), comprising:

a transceiver; and a processor, wherein the transceiver and the processor are configured to:

perform a small data transmission (SDT) in a radio resource control (RRC) inactive (RRC_INACTIVE) state, receive control information, select a first step-size based on a sum of a first offset and a second step-size indicated by the control information, on a condition that a first random access signal including a preamble is transmitted according to a first power, update a first counter of a number of transmissions of the preamble, on a condition that the first counter is not greater than a first threshold and a second counter is updated, transmit a third random access signal including a preamble according to a second power, wherein the second counter is counter of a number of times the first step-size is increased, on a condition that the first counter is greater than the first threshold, enter an RRC idle (RRC_IDLE) state, and monitor a second random access signal in a first time window of slots, wherein a difference between the second power and the first power is associated with the first step-size.

2. The UE according to claim 1, wherein whether the SDT is transmitted in the RRC_INACTIVE state is a determined according to a first reference signal receive quality (RSRP) and a size of the SDT.

3. The UE according to claim 2, wherein the transceiver and the processor are further configured to:

on a condition that the first RSRP is not less than a first RSRP threshold and a size of the SDT is not greater than a first size threshold, perform the SDT in the RRC_INACTIVE state.

4. The UE according to claim 1, wherein the first counter is a PREAMBLE_TRANSMISSION_COUNTER, and wherein updating the first counter includes increasing the first counter by 1, and wherein the first threshold is preambleTransMax and is configured via an RRC message.

5. The UE according to claim 1, wherein the second counter is a PREAMBLE_POWER_RAMPING_ COUNTER, and wherein updating the second counter includes increasing the second counter by 1, and wherein determining whether to update the second counter includes: determine whether a condition for updating the second counter is satisfied, and wherein the condition of updating the second counter including at least one of a value of the first counter being greater than 1, or not receiving a notification of suspending the first counter, or, not receiving a listen-before-talk (LBT) failure indication for a first signal, or a synchronization signal block (SSB) or a channel-state information reference signal (CSI-RS) not being changed.

6. The UE according to claim 1, wherein the first power is associated with a first initial power and first power difference value, and wherein the second power is associated with the first initial power, the first power difference value and a first power increment, and wherein a first difference value includes a DELTA PREAMBLE, and the first power difference value is associated with a format of a preamble, and wherein the first power increment is (the second counter-1)×the first step-size, and wherein the first initial power includes msgA-PreambleReceivedTargetPower or preambleReceivedTargetPower.

7. The UE according to claim 1, wherein the transceiver and the processor are further configured to;

receive control information indicating the first step-size.

8. The UE according to claim 1, wherein the transceiver and the processor are further configured to:

transmit first data and second data, and determine that a transmission of the first data is successful and a transmission of the second data failed, wherein the SDT includes the first data and the second data, and wherein a transmission of the first data being successful and a transmission of the second data having failed are used to determine that the difference between the second power and the first power is associated related to the first step-size.

9. The UE according to claim 1, wherein a size of the first step-size is unrelated to the SDT in the RRC_INACTIVE state and is associated with a 2-step random access procedure or a 4-step random access procedure.

10. The UE according to claim 9, wherein the first signal, second signal and third random access signals are used for the 2-step random access procedure.

11. The UE according to claim 9, wherein the first, second signal and third random access signals are used for the 4-step random access procedure.

12. The UE according to claim 9, wherein when the first random access signal is used for the 2-step random access procedure, and the third random access signal is used for the 4-step random access procedure, the difference between the second power and the first power is associated with a second offset, a difference between a first sub-step-size and a second sub-step-size and the first counter are used to determine the second offset, and the first sub-step-size and the second sub-step-size are respectively used to determine a power of the 2-step random access procedure and the 4-step random access procedure.

13. The UE according to claim 9, wherein the control information is used to determine a first candidate preamble sub-group, the first candidate preamble sub-group is used to indicate the SDT in the RRC_INACTIVE state, the first candidate preamble sub-group is one of a plurality of first-type preamble sub-groups, and a number of the plurality of first-type preamble sub-groups is associated with a characteristic of a preamble used for random access, and wherein the first random access signal includes a preamble in the first candidate preamble sub-group, and wherein the control information include a RACH-ConfigCommon IE or a RACH-ConfigCommonTwoStepRA IE.

14. The UE according to claim 13, wherein:

on a condition that the SDT is made in the RRC_INACTIVE state and the random access type is 2-step random access, a preamble used for a random access procedure is in a first one of first-type preamble sub-groups, on a condition that the SDT is made in the RRC_INACTIVE state and the random access type is 4-step random access, a preamble used for a random access procedure is a preamble in a second one of first-type preamble sub-groups, on a condition that the SDT is not made in the RRC_INACTIVE state and the random access type is 2-step random access, a preamble used for a random access procedure is a preamble in a third one of first-type preamble sub-groups, on a condition that the SDT is not made in the RRC_INACTIVE state and the random access type is 4-step random access, a preamble used for a random access procedure is a preamble in a fourth one of first-type preamble sequence sub-groups, and the first candidate preamble sub-group includes the first one of first-type preamble sequence sub-groups, or the first candidate preamble sub-group includes the second one of first-type preamble sub-groups.

15. The UE according to claim 1, wherein the control information is used to determine a first candidate preamble sub-group, the first candidate preamble sub-group is used to indicate the SDT in the RRC_INACTIVE state, the first candidate preamble sub-group is one of a plurality of first-type preamble sub-groups, and a number of the plurality of first-type preamble sub-groups is associated with a characteristic of a preamble used for random access, and wherein the first random access signal includes a preamble in the first candidate preamble sub-group, and wherein the control information include a RACH-ConfigCommon information element (IE) or a RACH-ConfigCommonTwoStepRA IE.

16. The UE according to claim 15, wherein the number of the plurality of first-type preamble sub-groups is four, and four first-type preamble sequence sub-groups are based on whether the SDT is in the RRC_INACTIVE and a random access type used for the SDT.

17. The UE according to claim 1, wherein the first step-size is used to determine a power-ramping factor, and wherein the SDT is generated by a higher layer, and wherein the first random access signal is used to trigger the second random access signal.

18. A method, comprising:

performing a small data transmission (SDT) in a radio resource control (RRC) inactive (RRC_INACTIVE) state;

receiving control information;

selecting a first step-size based on a sum of a first offset and a second step-size indicated by the control information;

on a condition that a first random access signal including a preamble is transmitted according to a first power, updating a first counter of a number of transmissions of the preamble;

on a condition that the first counter is not greater than a first threshold and a second counter is updated, transmitting a third random access signal including a preamble according to a second power, wherein the second counter is counter of a number of times the first step-size is increased;

on a condition that the first counter is greater than the first threshold, entering an RRC idle (RRC_IDLE) state; and monitoring a second random access signal in a first time window of slots, wherein a difference between the second power and the first power is associated with the first step-size.

* * * * *